(12) United States Patent
Wang et al.

(10) Patent No.: US 12,581,416 B2
(45) Date of Patent: Mar. 17, 2026

(54) MULTI-LINK SINGLE RADIO SUSPENSION AND OPERATING PARAMETERS

(71) Applicant: Apple Inc., Cupertino, CA (US)

(72) Inventors: Qi Wang, Sunnyvale, CA (US); Yong Liu, Campbell, CA (US); Jarkko L. Kneckt, Los Gatos, CA (US); Yoel Boger, Shoham (IL); Oren Shani, Saratoga, CA (US); Jinjing Jiang, San Jose, CA (US); Tianyu Wu, Fremont, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 434 days.

(21) Appl. No.: 18/188,166

(22) Filed: Mar. 22, 2023

(65) Prior Publication Data

US 2023/0319722 A1     Oct. 5, 2023

Related U.S. Application Data

(60) Provisional application No. 63/326,400, filed on Apr. 1, 2022.

(51) Int. Cl.
*H04W 52/02*          (2009.01)

(52) U.S. Cl.
CPC ................................ *H04W 52/0248* (2013.01)

(58) Field of Classification Search
CPC ......... H04W 74/0816; H04W 74/0866; H04W 76/19; H04W 76/15; H04W 76/16; H04W 84/12; H04W 8/24; H04L 1/0025; H04L 1/0023; H04L 1/0009; H04L 1/0003; H04B 7/0413
See application file for complete search history.

(56) References Cited

U.S. PATENT DOCUMENTS

| | | | | |
|---|---|---|---|---|
| 11,690,012 B2 * | 6/2023 | Naribole | ........... | H04W 52/0209 |
| | | | | 455/572 |
| 11,757,565 B2 * | 9/2023 | Chu | ....................... | H04L 1/0003 |
| | | | | 370/329 |
| 11,917,677 B2 * | 2/2024 | Cariou | ................ | H04W 74/085 |
| 11,943,665 B2 * | 3/2024 | Kwon | .................... | H04W 76/15 |
| 12,047,873 B2 * | 7/2024 | Naik | ................. | H04W 74/0816 |
| 12,160,824 B2 * | 12/2024 | Naribole | ........... | H04W 52/0283 |
| 12,192,819 B2 * | 1/2025 | Kim | .................... | H04L 47/2483 |
| 12,213,076 B2 * | 1/2025 | Chu | ................... | H04W 28/0268 |
| 12,213,173 B2 * | 1/2025 | Kim | ....................... | H04L 5/0096 |
| 12,245,304 B2 * | 3/2025 | Fang | ..................... | H04W 28/06 |
| 2021/0058868 A1 * | 2/2021 | Cariou | ............. | H04W 52/0206 |
| 2021/0274500 A1 * | 9/2021 | Cariou | ................. | H04W 48/08 |
| 2021/0377856 A1 * | 12/2021 | Chu | ................... | H04W 52/0216 |
| 2022/0029736 A1 * | 1/2022 | Chu | ....................... | H04L 1/0025 |

(Continued)

FOREIGN PATENT DOCUMENTS

| | | |
|---|---|---|
| DE | 102021134341 | 8/2022 |
| WO | 2022164293 | 8/2022 |

*Primary Examiner* — Jung Liu
(74) *Attorney, Agent, or Firm* — Kowert, Hood, Munyon, Rankin & Goetzel, P.C.

(57)          ABSTRACT

Methods, systems and apparatuses for managing enhanced multi-link single radio operation by an access point (AP) multi-link device (MLD) and non-AP MLD are described. A non-AP MLD may exchange parameters with an AP MLD. The non-AP MLD may request suspension of a multi-link single radio operation.

20 Claims, 24 Drawing Sheets

(56)  References Cited

U.S. PATENT DOCUMENTS

| | | | |
|---|---|---|---|
| 2022/0297736 A1* | 9/2022 | Hu | B62B 3/02 |
| 2022/0303893 A1* | 9/2022 | Chu | H04W 76/40 |
| 2023/0117078 A1* | 4/2023 | Chang | H04W 52/346 |
| | | | 370/318 |
| 2023/0164663 A1* | 5/2023 | Chang | H04W 40/12 |
| | | | 370/338 |
| 2023/0247092 A1* | 8/2023 | Ajami | H04L 67/1078 |
| | | | 709/238 |
| 2023/0269826 A1* | 8/2023 | Chu | H04W 52/0212 |
| | | | 370/311 |
| 2024/0205825 A1* | 6/2024 | Ratnam | H04W 52/0229 |
| 2024/0214936 A1* | 6/2024 | Du | H04W 60/04 |
| 2024/0251282 A1* | 7/2024 | Kim | H04W 76/15 |
| 2024/0340788 A1* | 10/2024 | Naik | H04W 52/0206 |
| 2024/0357656 A1* | 10/2024 | Huang | H04W 74/0816 |
| 2024/0407031 A1* | 12/2024 | Lin | H04L 5/0053 |
| 2024/0422613 A1* | 12/2024 | Kim | H04W 74/08 |
| 2025/0016860 A1* | 1/2025 | Lorgeoux | H04W 76/34 |
| 2025/0142399 A1* | 5/2025 | Kim | H04L 47/2483 |
| 2025/0212274 A1* | 6/2025 | Handte | H04L 5/14 |
| 2025/0220700 A1* | 7/2025 | Handte | H04W 74/002 |
| 2025/0234266 A1* | 7/2025 | Hwang | H04W 76/25 |
| 2025/0234378 A1* | 7/2025 | Dong | H04W 74/0816 |
| 2025/0287446 A1* | 9/2025 | Nagarajan | H04W 76/34 |

* cited by examiner

*100*

EML Capabilities subfield (in ML element)

| EMLSR Support | EMLSR Padding Delay | EMLSR Transition Delay | EMLMR Suport | EMLMR Delay | EMLSR Transition Timeout | Reserved | EMLMR Rx NSS | EMLMR Tx NSS |
|---|---|---|---|---|---|---|---|---|
| 1 | 3 | 3 | 1 | 3 | 4 | 1 | 4 | 4 |

Bits:

*FIG. 13A*

EML Capabilities subfield (in ML element)

| EMLSR Support | EMLSR Padding Delay | EMLSR Transition Delay | EMLMR Support | EMLMR Delay | Transition Timeout | Reserved |
|---|---|---|---|---|---|---|
| 1 | 3 | 3 | 1 | 3 | 4 | 1 |

Bits:

*FIG. 13B*

| EML Operating Mode Notification | | | | |
|---|---|---|---|---|
| | EML Control | | | |
| Category + EHT Action+ Dialog Token | EMLSR Mode | EMLMR Mode | EMLSR Link Bitmap | Reserved |
| Bits: | 1 | 1 | 16 | 6 |

*FIG. 14A*

| EML Operating Mode Notification | | | | | |
|---|---|---|---|---|---|
| | EML Control | | | | |
| Category + EHT Action+ Dialog | EMLSR Mode | EMLMR Mode | Reserved | EMLSR/EMLMR Link Bitmap | MCS Map Count Control | EMLMR Supported MCS and NSS Set |
| Bits: | 1 | 1 | 6 | 0 or 16 | 0 or 8 | Variable |

*FIG. 14B*

| Value | Meaning |
|-------|---------|
| 0 | EHT Compressed Beamforming/CQI |
| 1 | EML Operating Mode Notification |
| 2-255 | Reserved |

*FIG. 15*

| Order | Information |
|-------|-------------|
| 0 | Category |
| 1 | EHT Action |
| 2 | Dialog Token |
| 3 | EML Control |

*FIG. 16*

| | B0 | B1 | B2-17 | B18-23 |
|---|-----|-----|---------|---------|
| | EMLSR Mode | EMLMR Mode | EMLSR Bitmap | Reserved |
| Bits | 1 | 1 | 16 | 6 |

*FIG. 17A*

| | EMLSR Mode | EMLMR Mode | Reserved | EMLSR/EMLMR Link Bitmap | MCS Map Count Control | EMLMR Supported MCS and NSS Set |
|---|-----------|-----------|----------|--------------------------|-----------------------|----------------------------------|
| Bits | 1 | 1 | 6 | 0 or 16 | 0 or 8 | Variable |

*FIG. 17B*

| PM bit setting in EMLSR suspension request transmitted on one link (e.g. link 2) | Time to enter power save mode on the same link (e.g. link 2) | Time to enter active mode on another link (e.g., link 1) |
|---|---|---|
| PM = 1 | Time B | Time C |
| PM = 0 | Time C | Time C |

| PM bit setting in EMLSR resume request transmitted on one link (e.g. link 2) | Time to enter active mode on the same link (e.g., link 2) | Time to enter active mode on another link (e.g., link 1) |
|---|---|---|
| PM = 1 | Time E | Time E |
| PM = 0 | Time D | Time E |

| | B0-1 | B2 | B3-17 | B18-20 | B21-23 | B24 | B25-30 | B31 |
|---|---|---|---|---|---|---|---|---|
| | EMLSR Mode | EMLMR Mode | EMLSR Bitmap | EMLSR Padding Delay | EMLSR Transition Delay | EMLSR Suspension Type | EMLSR Suspension Duration (if Type 1) | Reserved |
| Bits | 2 | 1 | 15 | 3 | 3 | 1 | 6 | 1 |

*FIG. 29A*

| | EMLSR Mode | EMLMR Mode | Reserved | EMLSR/ EMLMR Link Bitmap | EMLSR Padding Delay | EMLSR Transition Delay | EMLSR Suspension Type | EMLSR Suspension Duration (if Type 1) | MCS Map Count Control | EMLMR Supported MCS and NSS Set |
|---|---|---|---|---|---|---|---|---|---|---|
| Bits | 1 | 1 | 6 | 0 or 16 | 3 | 3 | 1 | 6 | 0 or 8 | Variable |

*FIG. 29B*

| EMLSR Mode | Meaning |
|---|---|
| 0 | Non-AP MLD disables EMLSR mode |
| 1 | Non-AP MLD enables EMLSR mode |
| 2 | Non-AP MLD request to suspend the EMLSR operation |
| 3 | Non-AP MLD request to resume the EMLSR operation after suspension |

*FIG. 30*

| B0-1 | B2 | B3-10 | B11-13 | B14-16 | B17 | B18-23 |
|---|---|---|---|---|---|---|
| EMLSR Mode | EMLMR Mode | EMLSR Bitmap | EMLSR Padding Delay | EMLSR Transition Delay | EMLSR Suspension Type | EMLSR Suspension Duration (if Type 1) |
| 2 | 1 | 8 | 3 | 3 | 1 | 6 |

*Bits*

*FIG. 31A*

| EMLSR Mode | EMLMR Mode | Reserved | EMLSR/ EMLMR Link Bitmap | EMLSR Padding Delay | EMLSR Transition Delay | EMLSR Suspension Type | EMLSR Suspension Duration (if Type 1) | MCS Map Count Control | EMLMR Supported MCS and NSS Set |
|---|---|---|---|---|---|---|---|---|---|
| 1 | 1 | 6 | 0 or 8 | 3 | 3 | 1 | 6 | 0 or 8 | Variable |

*Bits*

*FIG. 31B*

| | B0 | B1 | B2-15 | B16 | B17 | B18-20 | B21-23 |
|---|---|---|---|---|---|---|---|
| | EMLSR Mode | EMLMR Mode | EMLSR Bitmap | EMLSR Suspension mode | EMLSR Suspension Type | EMLSR Padding Delay | EMLSR Transition Delay or EMLSR Suspension Duration (if Type 1) |
| Bits | 1 | 1 | 14 | 1 | 1 | 3 | 3 |

FIG. 32A

| EMLSR Mode | EMLMR Mode | Reserved | EMLSR/ EMLMR Link Bitmap | EMLSR Suspension Mode | EMLSR Suspension Type | EMLSR Padding Delay | EMLSR Transition delay or EMLSR Suspension Duration (if Type 1) | MCS Map Count Control | EMLMR Supported MCS and NSS Set |
|---|---|---|---|---|---|---|---|---|---|
| 1 | 1 | 6 | 0 or 16 | 1 | 1 | 3 | 3 | 0 or 8 | Variable |
| Bits | | | | | | | | | |

FIG. 32B

| Value | EMLSR Suspension Mode Meaning |
|---|---|
| 0 | Non-AP MLD request to suspend the EMLSR operation |
| 1 | Non-AP MLD request to resume the EMLSR operation after suspension |

FIG. 33

| Value | Meaning |
|---|---|
| 0 | EHT Compressedd Beamforming/CQI |
| 1 | EML Operating Mode Notification |
| 2 | EMLSR Suspension Control |
| 2 3-255 | Reserved |

*FIG. 34*

| B0 | B1 | B2-7 |
|---|---|---|
| EMLSR Suspension Mode | Suspension Type | EMLSR Suspension Duration (if Type = 1) or Reserved (if Type = 2) |
| 1 | 1 | 6 |

Bits

*FIG. 35*

EML Capabilities subfield (in ML element)

| EMLSR Support | EMLSR Transition Timeout | EMLSR Suspension Timeout | EMLMR Support | EMLMR Delay | Reserved | EMLMR Rx NSS | EMLMR Tx NSS |
|---|---|---|---|---|---|---|---|
| 1 | 4 | 4 | 1 | 3 | 2 | 4 | 4 |

Bits:

*FIG. 36A*

EML Capabilities subfield (in ML element)

| EMLSR Support | EMLSR Transition Timeout | EMLSR Suspension Timeout | EMLMR Support | EMLMR Delay | Reserved |
|---|---|---|---|---|---|
| 1 | 3 | 3 | 1 | 3 | 4 |

Bits:

*FIG. 36B*

MULTI-LINK SINGLE RADIO SUSPENSION AND OPERATING PARAMETERS

PRIORITY INFORMATION

This application claims priority to U.S. provisional patent application Ser. No. 63/326,400, entitled "Multi-link single radio suspension and operating parameters," filed Apr. 1, 2022, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, including techniques for wireless communication among wireless stations and/or access points in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (and/or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices", "user equipment", or STA or UE for short. Wireless stations can be either wireless access points or wireless clients (and/or mobile stations). Access points (APs), which are also referred to as wireless routers, act as base stations for the wireless network. APs transmit and receive radio frequency signals for communication with wireless client devices. APs may also couple to the Internet in a wired and/or wireless fashion. Wireless clients operating on an 802.11 network can be any of various devices such as laptops, tablet devices, smart phones, smart watches, or fixed devices such as desktop computers. Wireless client devices are referred to herein as user equipment (and/or UE for short). Some wireless client devices are also collectively referred to herein as mobile devices or mobile stations (although, as noted above, wireless client devices overall may be stationary devices as well).

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

Some WLANs may utilize multi-link operation (MLO), e.g., using a plurality of channels (e.g., links) concurrently. APs and/or STAs capable of MLO may be referred to as multi-link devices (MLD). For example, APs capable of MLO may be referred to as AP-MLDs and STAs capable of MLO that are not acting as APs may be referred to as non-AP MLDs.

Some non-AP MLDs may use different radios with different levels of capability. Such non-AP MLDs may switch a radio with higher capabilities between multiple links, e.g., according to enhanced multi-link single radio (EMLSR) operation. Improvements in the field are desired.

SUMMARY

Embodiments described herein relate to systems, methods, apparatuses, and mechanisms for enhanced single radio operation by AP and non-AP MLDs.

An apparatus may comprise a processor configured to cause a non-access point (AP) multi-link device (MLD) (non-AP MLD) to associate with an AP MLD. The non-AP MLD may exchange one or more multi-link parameters associated with a first mode (e.g., enhanced multi-link single radio (EMLSR) mode) for communication with the AP MLD and enable the first mode for a first link and a second link. The non-AP MLD may determine to suspend the first mode and transmit, to the AP MLD, a request to suspend the first mode without disabling the first mode. The non-AP MLD may suspend the first mode and resume the first mode.

A non-access point (AP) multi-link device (MLD) (non-AP MLD) may comprise: a first radio; a second radio having less capability (e.g., a lower level of capability such as lower bandwidth, lower number of spatial streams, lack of transmit capability, etc.) than the first radio; and a processor operably coupled to the first radio and the second radio and configured to cause the non-AP MLD to establish communication with an AP MLD. The non-AP MLD may transmit, to the AP MLD, at least one parameter related to an enhanced multi-link single radio (EMLSR) mode and operate, according to the EMLSR mode, for a first period of time. The non-AP MLD may suspend, for a second period of time subsequent to the first period of time, operation according to the EMLSR mode; and resume, subsequent to the second period of time, operation according to the EMLSR mode.

A method, at an access point (AP) multi-link device (MLD) (AP MLD), may comprise providing a plurality of links comprising at least a first link and a second link. The method may further include associating with a non-access point MLD (non-AP MLD) and exchanging, with the non-AP MLD, at least one parameter related to an enhanced multi-link single radio (EMLSR) mode. The method may further include receiving, from the non-AP MLD on the first link or the second link, a request to enter the EMLSR mode for the first link and the second link and receiving, from the non-AP MLD on the first link or the second link, a request to suspend the EMLSR mode for the first link and the second link. The method may further include suspending, for the non-AP MLD, the EMLSR mode for the first link and the second link and determining an end time for suspension, for the non-AP MLD, of the EMLSR mode for the first link and the second link. The method may further include resuming, for the non-AP MLD, the EMLSR mode for the first link and the second link.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 9-16, 17A, and 17B illustrate example aspects of EMLSR operation, according to some embodiments.

FIGS. 19-35, 36A, and 36B illustrate further example aspects of EMLSR operation, according to some embodiments.

Figure 1:
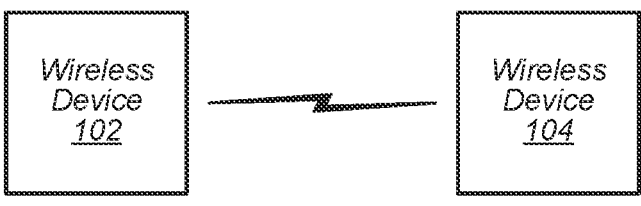
FIG. 1 illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
STA: Wireless Station
TX: Transmission/Transmit
RX: Reception/Receive
MLD: Multi-link Device
LAN: Local Area Network WLAN: Wireless LAN
RAT: Radio Access Technology
QoS: Quality of Service
UL: Uplink
DL: Downlink

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (and/or combination of devices) having at least one processor that executes instructions from a memory medium.

Mobile Device (and/or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (and/or combination of devices) which is easily transported by a user and capable of wireless communication using WLAN or Wi-Fi.

Wireless Device (and/or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (and/or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
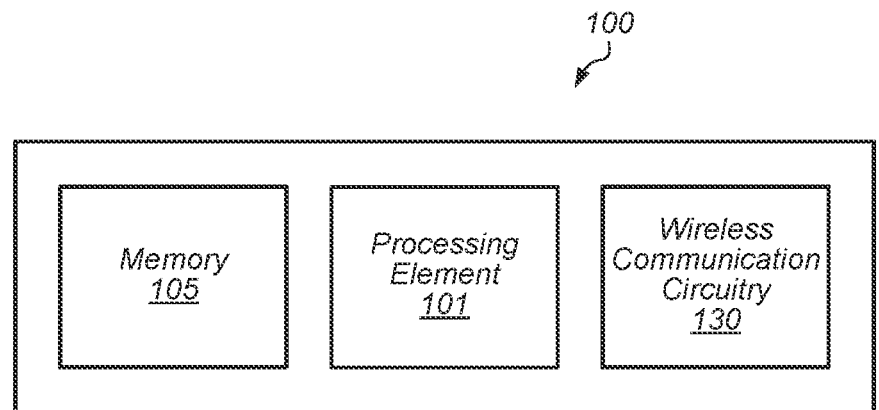
FIG. 2 illustrates an example simplified block diagram of a wireless device, according to some embodiments.

FIGS. 1-2—Wireless Communication System

FIG. 1 illustrates an exemplary (and simplified) wireless communication system in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques.

As one possibility, the first wireless device 102 and the second wireless device 104 may perform communication using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), cellular (e.g., 4G and/or 5G such as LTE, NR, etc.), etc. Furthermore, the devices may be capable of wireless position determination, e.g., using GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, hand-held device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of 4G, 5G, etc., and separate radios for communicating using each of Wi-Fi and Bluetooth. Other configurations are also possible.

As previously noted, aspects of this disclosure may be implemented in conjunction with the wireless communication system of FIG. 1. For example, a wireless device (e.g., either of wireless devices 102 or 104) may be configured to perform methods for any/all of robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD.

FIG. 2 illustrates an exemplary wireless device 100 (e.g., corresponding to wireless devices 102 and/or 104) that may be configured for use in conjunction with various aspects of the present disclosure. The device 100 may be any of a variety of types of device and may be configured to perform any of a variety of types of functionality. The device 100 may be a substantially portable device or may be a substantially stationary device, potentially including any of a variety of types of device. The device 100 may be configured to perform one or more wireless communication techniques or features, such as any of the techniques or features illustrated and/or described subsequently herein with respect to any or all of the Figures.

As shown, the device 100 may include a processing element 101. The processing element may include or be coupled to one or more memory elements. For example, the device 100 may include one or more memory media (e.g., memory 105), which may include any of a variety of types of memory and may serve any of a variety of functions. For example, memory 105 could be RAM serving as a system memory for processing element 101. Other types and functions are also possible.

Additionally, the device 100 may include wireless communication circuitry 130. The wireless communication circuitry may include any of a variety of communication elements (e.g., antenna(s) for wireless communication, analog and/or digital communication circuitry/controllers, etc.) and may enable the device to wirelessly communicate using one or more wireless communication protocols.

Note that in some cases, the wireless communication circuitry 130 may include its own processing element (e.g., a baseband processor), e.g., in addition to the processing element 101. For example, the processing element 101 may be an 'application processor' whose primary function may be to support application layer operations in the device 100, while the wireless communication circuitry 130 may be a 'baseband processor' whose primary function may be to support baseband layer operations (e.g., to facilitate wireless communication between the device 100 and other devices) in the device 100. In other words, in some cases the device 100 may include multiple processing elements (e.g., may be a multi-processor device). Other configurations (e.g., instead of or in addition to an application processor/baseband processor configuration) utilizing a multi-processor architecture are also possible.

The device 100 may additionally include any of a variety of other components (not shown) for implementing device functionality, depending on the intended functionality of the device 100, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 100, such as processing element 101, memory 105, and wireless communication circuitry 130, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (and/or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 101, peripheral interfaces for communication with peripheral components within or external to device 100, etc.) may also be provided as part of device 100.

FIG. 3—WLAN System

Figure 3:
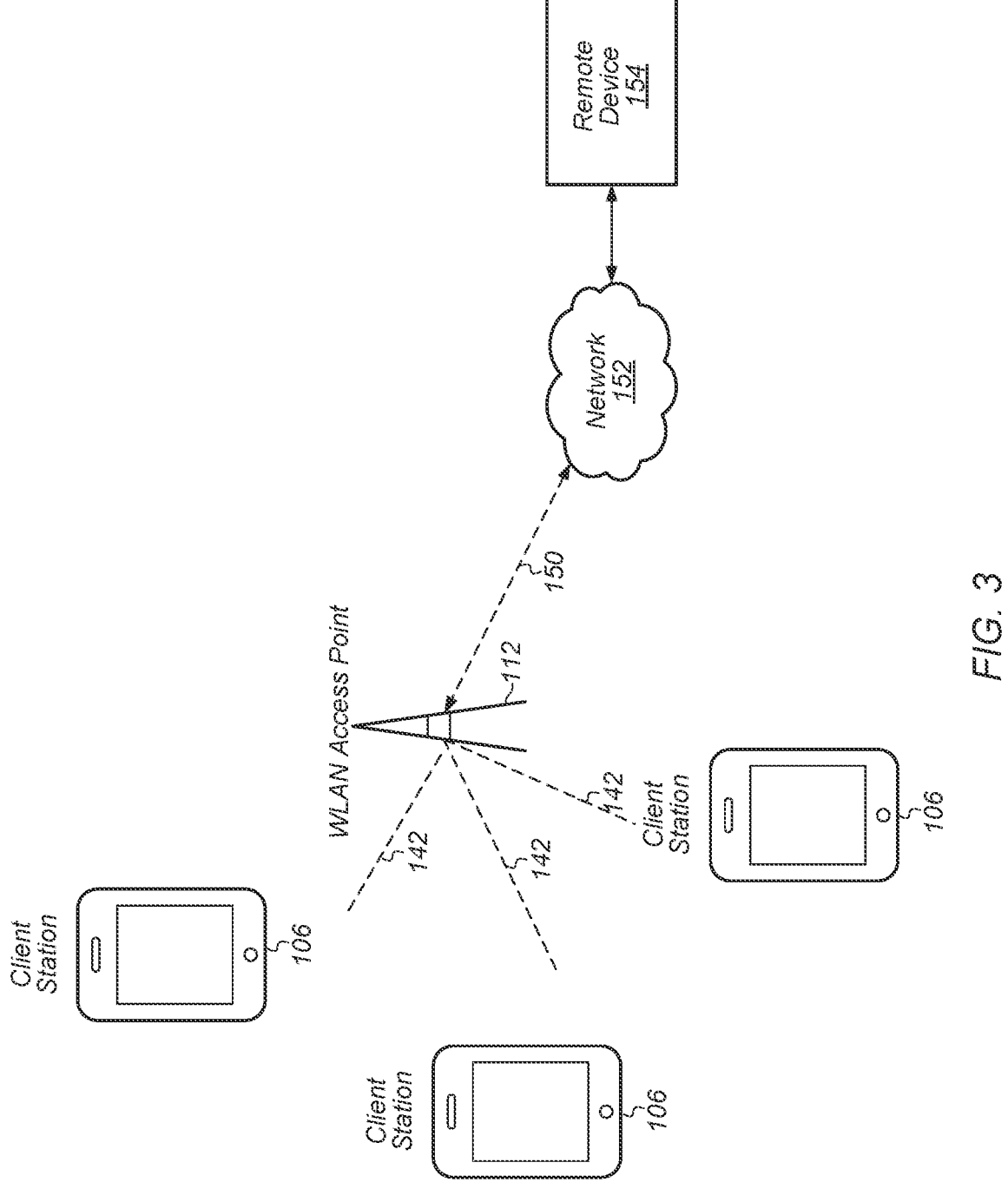
FIG. 3 illustrates an example WLAN communication system, according to some embodiments.

FIG. 3 illustrates an example WLAN system according to some embodiments. As shown, the exemplary WLAN system includes a plurality of wireless client stations or devices (e.g., STAs or user equipment (UEs)), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station, a server associated with an application executing on one of the STAs 106, etc. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, a wireless device 106 (which may be an exemplary implementation of device 100) may be configured to perform methods for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD.

Figure 4:
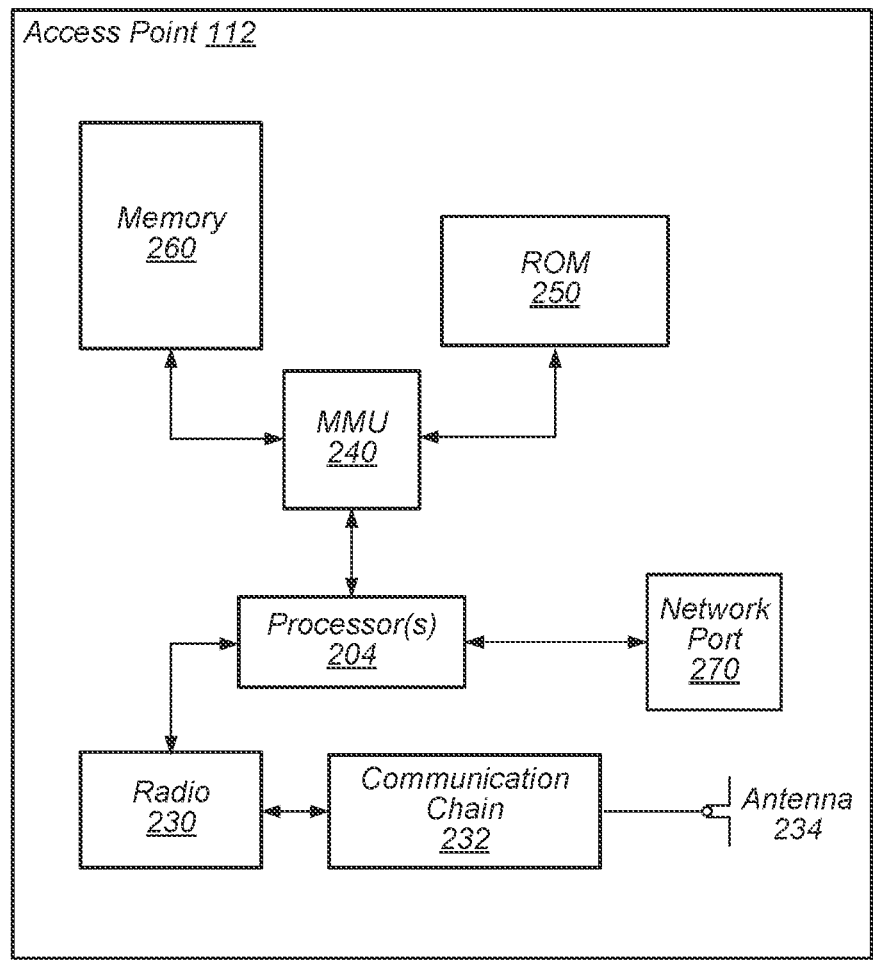
FIG. 4 illustrates an example simplified block diagram of a WLAN Access Point (AP), according to some embodiments.

FIG. 4—Access Point Block Diagram

FIG. 4 illustrates an exemplary block diagram of an access point (AP) 112, which may be one possible exemplary implementation of the device 100 illustrated in FIG. 4. It is noted that the block diagram of the AP of FIG. 4 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (and/or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 4G, 5G, etc., for example when the AP is co-located with a base station in case of a small cell, or in other instances when it may be desirable for the AP 112 to communicate via various different wireless communication technologies.

Further, in some embodiments, as further described below, AP 112 may be configured to perform methods for any/all of robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD.

Figure 5:
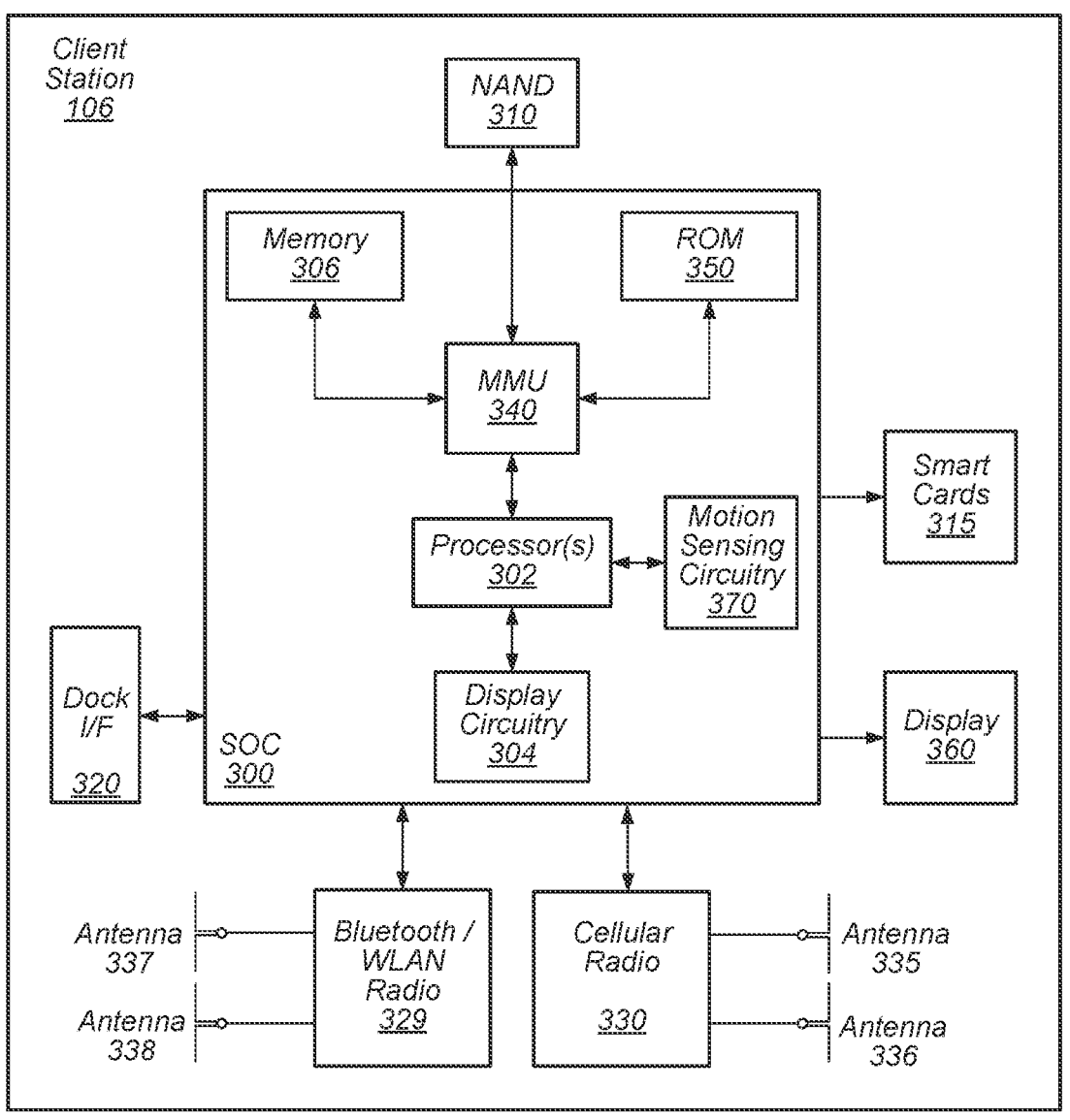
FIG. 5 illustrates an example simplified block diagram of a wireless station (STA), according to some embodiments.

FIG. 5—Client Station Block Diagram

FIG. 5 illustrates an example simplified block diagram of a client station 106, which may be one possible exemplary implementation of the device 100 illustrated in FIG. 2. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (and/or dock) 320 (e.g., for coupling to a computer system, dock, charging station, etc.), the display 360, cellular communication circuitry (e.g., cellular radio) 330 such as for 5G NR, LTE, GSM, etc., and short to medium range wireless communication circuitry (e.g., Bluetooth™/WLAN radio) 329 (e.g., Bluetooth™ and WLAN circuitry). The client station 106 may further include one or more smart cards 315 that incorporate SIM (Subscriber Identity Module) functionality, such as one or more UICC(s) (Universal Integrated Circuit Card(s)). The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration. Some or all components of the short to medium range wireless communication circuitry 329 and/or the cellular communication circuitry 330 may be used for wireless communications, e.g., using WLAN, Bluetooth, and/or cellular communications.

As shown, the SOC 300 may include processor(s) 302, which may execute program instructions for the client station 106 and display circuitry 304, which may perform graphics processing and provide display signals to the display 360. The SOC 300 may also include motion sensing circuitry 370 which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 3 or in FIG. 1.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (and/or in addition), processor 302 may be configured as a programmable hardware element, such as an FPGA (Field Programmable Gate Array), or as an ASIC (Application Specific Integrated Circuit). Alternatively (and/or in addition) the processor 302 of the UE 106, in conjunction with one or more of the other components 300, 304, 306, 310, 315, 320,329, 330, 335, 336, 337, 338, 340, 350, 360, 370 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Figure 6:
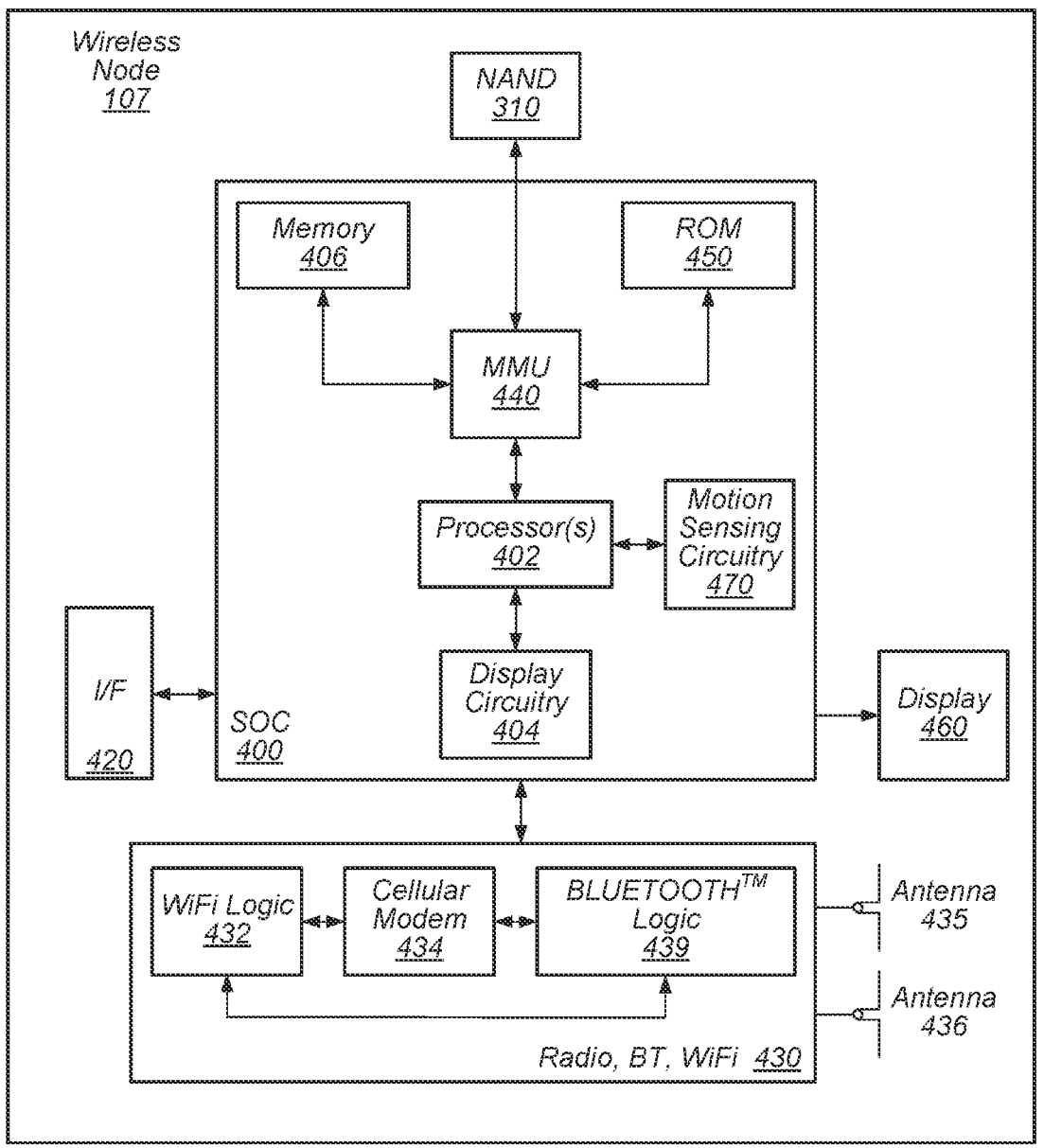
FIG. 6 illustrates an example simplified block diagram of a wireless node, according to some embodiments.

FIG. 6—Wireless Node Block Diagram

FIG. 6 illustrates one possible block diagram of a wireless node 107, which may be one possible exemplary implementation of the device 106 illustrated in FIG. 5. As shown, the wireless node 107 may include a system on chip (SOC) 400, which may include portions for various purposes. For example, as shown, the SOC 400 may include processor(s) 402 which may execute program instructions for the wireless node 107, and display circuitry 404 which may perform graphics processing and provide display signals to the display 460. The SOC 400 may also include motion sensing circuitry 470 which may detect motion of the wireless node 107, for example using a gyroscope, accelerometer, and/or any of various other motion sensing components. The processor(s) 402 may also be coupled to memory management unit (MMU) 440, which may be configured to receive addresses from the processor(s) 402 and translate those addresses to locations in memory (e.g., memory 406, read only memory (ROM) 450, flash memory 410). The MMU 440 may be configured to perform memory protection and page table translation or set up. In some embodiments, the MMU 440 may be included as a portion of the processor(s) 402.

As shown, the SOC 400 may be coupled to various other circuits of the wireless node 107. For example, the wireless node 107 may include various types of memory (e.g., including NAND flash 410), a connector interface 420 (e.g., for coupling to a computer system, dock, charging station, etc.), the display 460, and wireless communication circuitry 430 (e.g., for 5G NR, LTE, LTE-A, Bluetooth, Wi-Fi, NFC, GPS, etc.).

The wireless node 107 may include at least one antenna, and in some embodiments, multiple antennas 435 and 436, for performing wireless communication with base stations and/or other devices. For example, the wireless node 107 may use antennas 435 and 436 to perform the wireless communication. As noted above, the wireless node 107 may in some embodiments be configured to communicate wirelessly using a plurality of wireless communication standards or radio access technologies (RATs).

The wireless communication circuitry 430 may include Wi-Fi Logic 432, a Cellular Modem 434, and Bluetooth Logic 439. The Wi-Fi Logic 432 is for enabling the wireless node 107 to perform Wi-Fi communications, e.g., on an 802.11 network. The Bluetooth Logic 439 is for enabling the wireless node 107 to perform Bluetooth communications. The cellular modem 434 may be capable of performing cellular communication according to one or more cellular communication technologies. Some or all components of the wireless communication circuitry 430 may be used for wireless communications, e.g., using WLAN, Bluetooth, and/or cellular communications.

As described herein, wireless node 107 may include hardware and software components for implementing embodiments of this disclosure. For example, one or more components of the wireless communication circuitry 430 (e.g., Wi-Fi Logic 432) of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

FIGS. 7-17—Multi-Link Device (MLD) Operation

Various communication standards such as IEEE 802.11be may include Multi-link Device (MLD) capabilities. In current implementations, an access point (AP) Multi Link Device (MLD) node may manage its affiliated APs. Thus, an AP MLD node may modify, add, and/or subtract affiliated APs to increase capacity, manage Basic Service Sets (BSSs) interference and coverage, including switching APs to operate in channels with lower interference, and/or steer associated non-AP MLD nodes to operate on better performing APs and/or AP MLD nodes.

Figure 7:
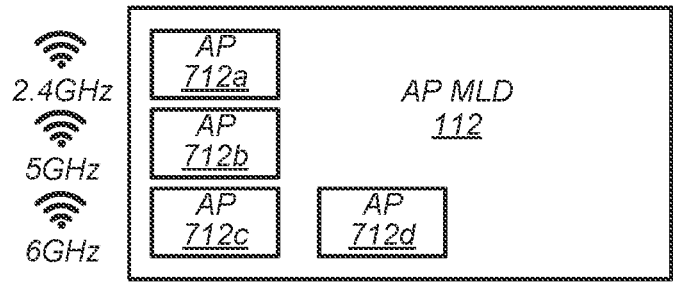
FIG. 7 illustrates an example of an AP MLD, according to some embodiments.

FIG. 7 illustrates an AP MLD 112, according to some embodiments. The AP MLD may operate any number of affiliated APs, e.g., APs 712a, 712b, 712c, and 712d in the illustrated example. The affiliated APs may operate on any of various frequency bands. Affiliated APs may operate on different frequency ranges (e.g., channels) of the same band, or on different frequency bands. In the illustrated example, AP 712a may operate in a 2.4 GHz band, AP 712b may operate in a 5 GHz band, and APs 712c and 712d may operate in a 6 GHz band. Other arrangements (e.g., of the same and/or other frequency bands) are possible.

The AP MLD may provide the affiliated APs from a single physical device, e.g., a single shared housing and potentially using the same antenna(s). In some embodiments, the AP MLD may provide the APs from multiple distinct devices (e.g., a first device may provide one or more APs, a second device may provide a different one or more APs, etc.). In some embodiments, various affiliated APs may be separated spatially (e.g., beams in different directions, using different antennas with a shared housing (e.g., antennas of a same physical device), and/or of different devices, etc.).

In some embodiments, spatially separated affiliated APs may operate on a same (or at least partially overlapping) channel(s).

The AP MLD may communicate with any number of non-AP MLDs. For example, device 106 may be a non-AP MLD. It will be appreciated that one non-AP MLD may communicate with the AP MLD using any number of the various affiliated APs. In other words, one non-AP MLD may operate on any number of links with the AP MLD. The non-AP MLD may have a corresponding affiliated STA for a corresponding link. Different non-AP MLDs may communicate with different and/or the same affiliated APs.

Figure 8:
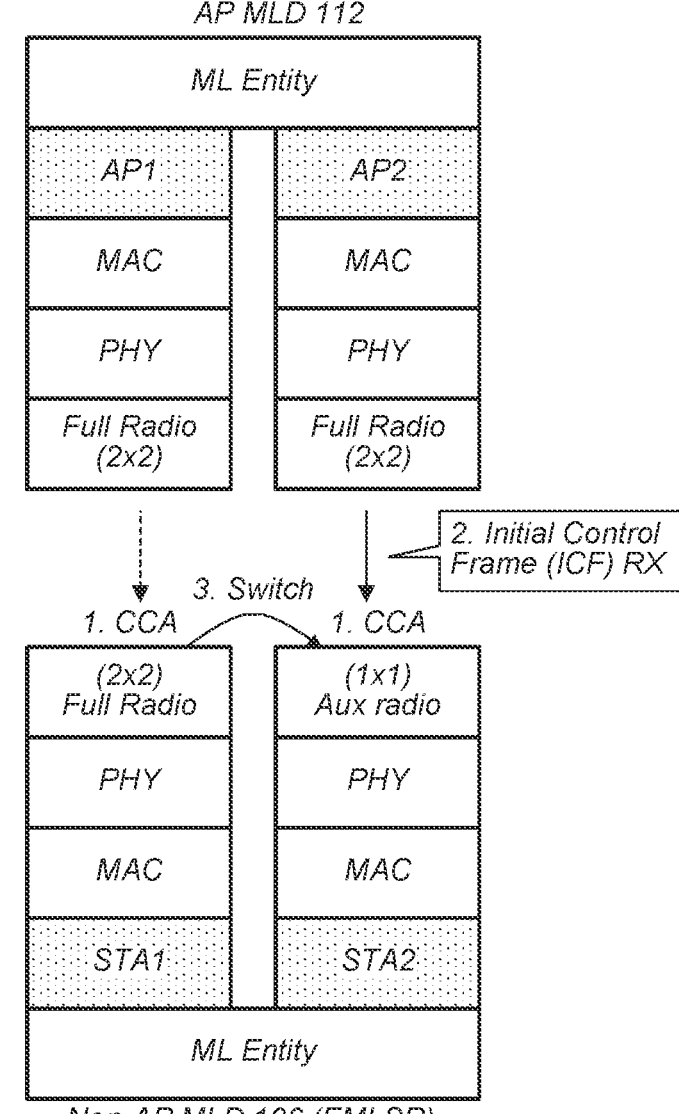
FIG. 8 illustrates an example of two MLDs in communication, according to some embodiments.

FIG. 8 illustrates an AP MLD 112 in communication with a non-AP MLD 106, according to some embodiments. In the illustrated example, the AP MLD and non-AP MLD may communicate using two links between corresponding affiliated APs and STAs. It will be appreciated that additional links may be used, as desired.

The two links may (e.g., at the time illustrated) operate according to Enhanced Multi-Link Single Radio (EMLSR), among various possibilities. EMLSR operation may be specified as one operation mode in the 802.11be specification. EMLSR may enable a non-AP MLD to share one or more full radio(s) and one or more auxiliary (e.g., partial, reduced capability, and/or limited capability) radio(s) between two or more links, e.g., which are enabled for EMLSR. For example, a full radio may switch between a number of EMLSR-enabled links. The full and auxiliary radios may be physically distinct radios in the same MLD. Various possible changes and/or additions to EMLSR may be discussed further below.

EMLSR mode may enable a non-AP MLD with following configurations to transmit and/or receive two or more spatial steams on any one of the enabled links, e.g., whenever the channel medium on the link become available. Examples include but are not limited to:

One full radio (e.g., 2×2 spatial streams (SS)) and one auxiliary radio (receive (RX) only)

One full radio (e.g., 2×2) and one auxiliary radio (limited bandwidth (BW), throughput, and/or SS for transmission (TX) and RX)

Per 802.11be (e.g., draft D1.4), when operating in the EMLSR mode, a non-AP MLD may be able to support clear channel access (CCA) (e.g., such as energy detection (ED)) and to receive an initial control frame (ICF) on all EMLSR links (e.g., typically two links, but possibly more links). An ICF may be sent (e.g., by the AP MLD) in one or more orthogonal frequency division multiplex (OFDM) physical protocol data unit (PPDU) or non-HT duplicate PPDU using a rate of 6, 12, or 24 Mbps, among various possibilities. An ICF may be a multi-user (MU) request to send (RTS) (MU-RTS) or a Buffer Status Report Poll (BSRP) trigger frame. The ICF may be an indication by the AP MLD to the non-AP MLD to switch the full radio from one EMLSR link to another.

In some embodiments, ICF may be used only for DL (e.g., not for UL) transmission for EMLSR operation. For example, the non-AP MLD may freely switch between links during EMLSR for UL transmissions.

The AP MLD and non-AP MLD may exchange configuration information about EMLSR, e.g., including various parameter values. The non-AP MLD may indicate an ICF padding duration and the non-AP MLD may indicate an EMLSR Transition Delay. The ICF padding duration may indicate the amount of time an ICF may be padded so the non-AP MLD may switch the full radio from another link to the link on which the ICF is transmitted and be ready to transmit a response frame (e.g., clear to send (CTS)) to the ICF (e.g., on a link following a link switch due to the ICF). The EMLSR Transition Delay may indicate the amount of time that the non-AP MLD needs between the end of the frame exchange sequence and the non-AP MLD's switching back to the listening operation on the EMLSR links. The AP MLD may indicate EMLSR Transition Timeout (e.g., the amount of time that the AP MLD needs to enter/exit EMLSR mode). Configuration information, including these indications, may be transmitted when communication is established, during association, when EMLSR is enabled, or as otherwise discussed herein.

During a frame exchange sequence (e.g., following an ICF), the non-AP MLD may communicate with the AP MLD only on the link where the ICF is received. When the non-AP determines the frame exchange sequence has ended, the non-AP MLD may begin to use another EMLSR link after EMLSR Transition Delay immediately following the end of the frame exchange sequence.

Only one STA of the non-AP MLD that corresponds to one of the EMLSR links may initiate frame exchange with AP MLD at a time. In some embodiments, the non-AP MLD may not have more than one STA to initiate frame exchange sequences on more than one link with the AP MLD simultaneously.

Figures 9, 10:
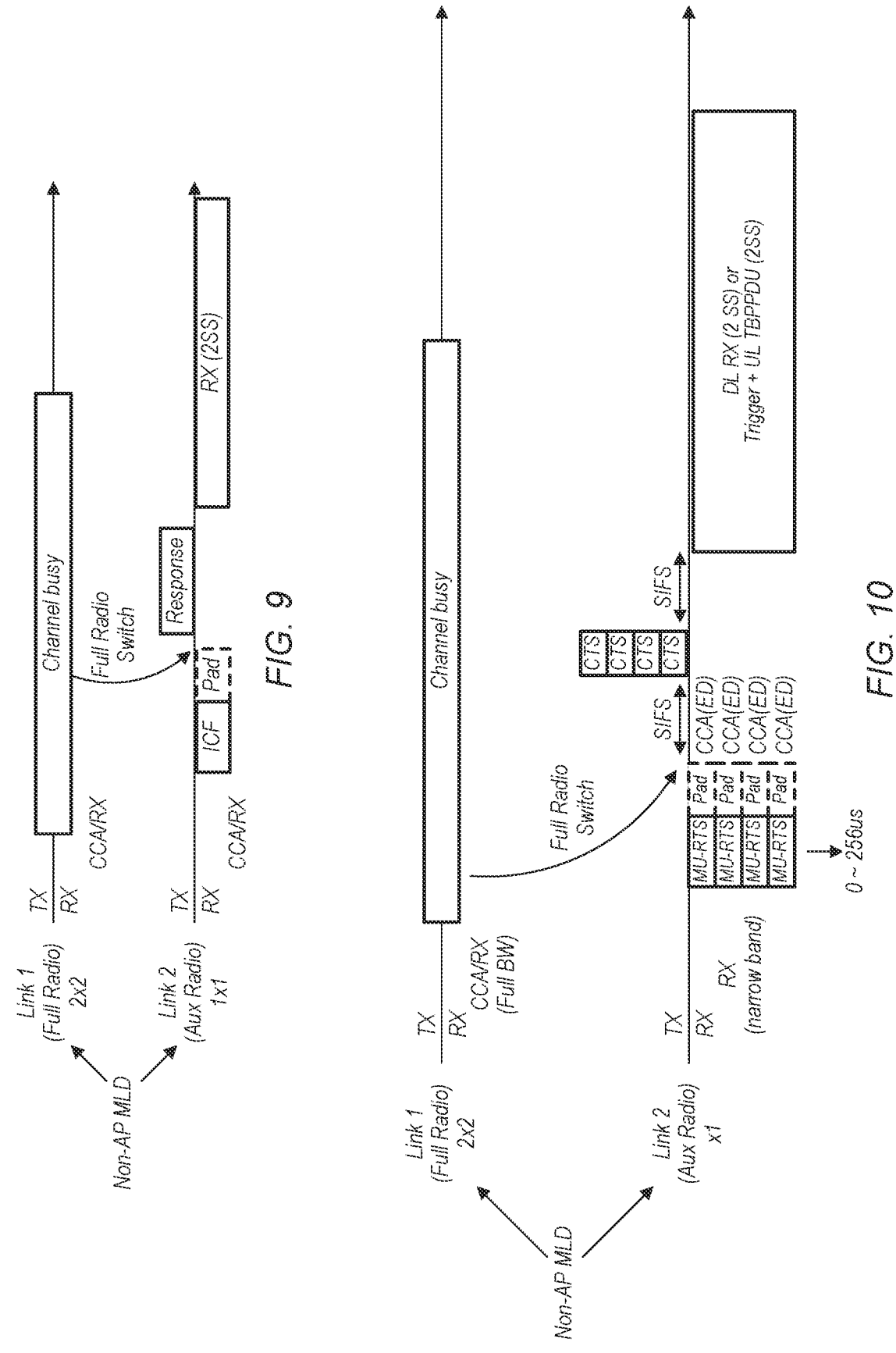

FIG. 9 illustrates a possible timeline of EMLSR operation of the non-AP MLD, showing the same sequence of events as FIG. 8, according to some embodiments. As shown, a full radio may initially operate on link 1 (connecting AP1 and STA1) while an auxiliary radio may operate on link 2. The non-AP MLD may perform a CCA on both links. The AP MLD may perform a CCA on both links. The AP MLD may determine that the channel for link 1 is busy. The AP MLD may transmit an ICF (e.g., on link 2). In response to receiving the ICF, the non-AP MLD may switch the full radio to the second link (the auxiliary radio may or may not be switched to link 1). In some respects, the padding time may be considered part of ICF, e.g., an ICF may be made longer by adding the padding.

The non-AP MLD may first transmit a response frame to the ICF. Subsequently, the non-AP MLD may receive downlink traffic or perform a trigger-based UL transmission (e.g., using the full radio) on link 2 (e.g., using the full radio, noted as using 2 SS).

FIG. 10 illustrates further detail of DL operation using EMLSR, according to some embodiments. Similar to FIGS. 8 and 9, a full radio may be initially on link 1. The AP MLD may determine that a channel for link 1 is busy and transmit an ICF (in the form of MU-RTS on any number of subchannels (e.g., 4 subchannels, in the illustrated example)) on link 2. Notably, the non-AP MLD may receive the MU-RTS on only a narrowband (e.g., according to the capability of the auxiliary radio). However, the non-AP MLD may recognize the MU-RTS as an ICF. Thus, the non-AP MLD may switch the full radio to link 2 in response to the MU-RTS/ICF.

Following the padding time (e.g., after the switch is complete), the non-AP MLD may perform a CCA on each subchannel of link 2 using the full radio. Following a short interframe space (SIFS), the non-AP MLD may transmit a clear to send (CTS) on any subchannel(s) of link 2 that are determined to be clear. Following a second SIFS, the non-AP MLD may exchange data with the AP MLD using the full radio on link 2. For example, a DL transmission may use the full BW and/or number of SS of the full radio. Additionally, a UL transmission (e.g., of a trigger-based (TB) PPDU) may be performed using the full radio by the non-AP MLD in response to a trigger frame transmitted by the AP MLD.

EMLSR operation for DL at a non-AP MLD may include: receiving ICF (e.g., MU-RTS) on a link with the auxiliary radio (e.g., link 2) and switching the full-radio by end of MU-RTS (padded) to allow full BW CCA during SIFS. Note: an EMLSR non-AP MLD may inform the AP MLD the pad length (e.g., a value between 0 and 256 us).

Figure 11:
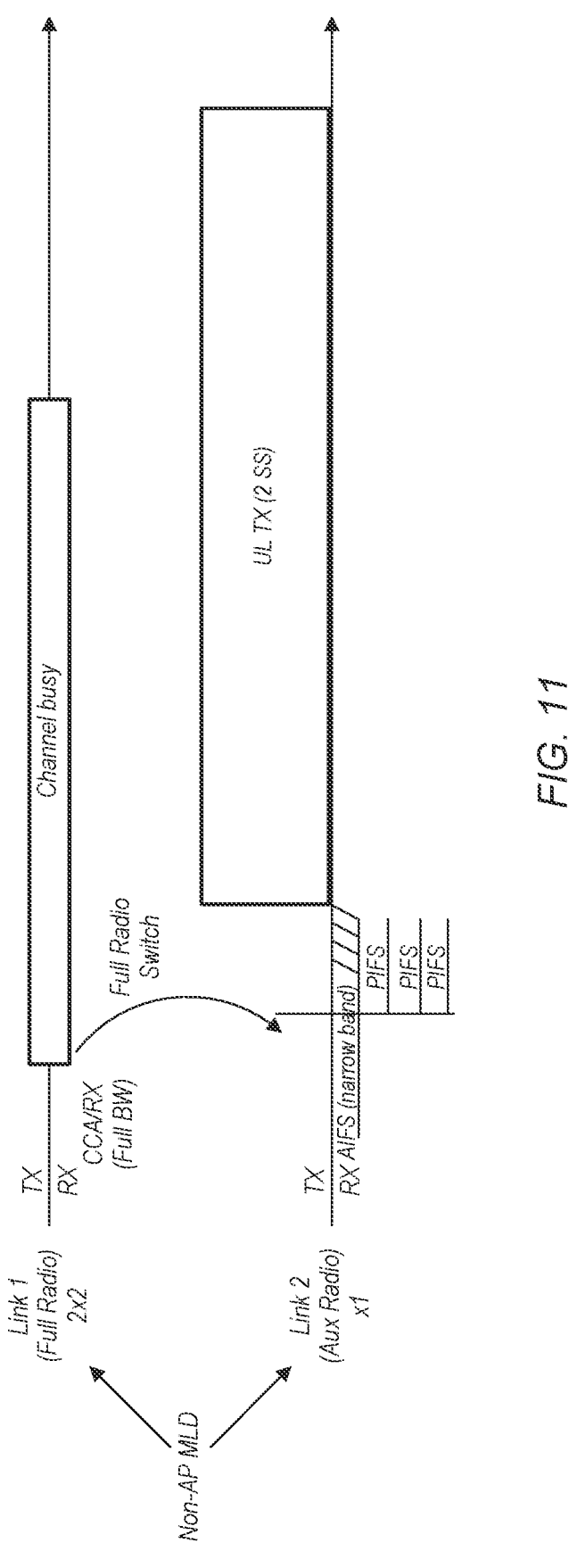

FIG. 11 illustrates further detail of UL operation using EMLSR, according to some embodiments. Similar to FIGS. 8-10, a full radio may be initially on link 1. EMLSR operation for UL at a non-AP MLD may include clear channel assessment (CCA), enhanced distributed channel access (EDCA) (e.g., which may include CCA), and network allocation vector (NAV) support on a link with the auxiliary radio (e.g., link 2). The non-AP MLD may determine (e.g., during EDCA) that a channel for link 1 is busy. In response, the non-AP MLD may switch the full radio to link 2 (e.g., without receiving an ICF/MU-RTS from the AP MLD). Note that ICF may be used for trigger-based UL transmission, but may not be used for other types of UL transmission, according to some embodiments. The switch may occur during an ongoing arbitrary inter-frame space (AIFS) associated with link 2. The non-AP MLD may use the full radio to complete a full bandwidth CCA during the point coordination function (PCF) interframe space (PIFS) immediately before a EDCA countdown reaches zero when the uplink transmission begins. Following the PIFS, the AP MLD may use the full radio to transmit using up to the full BW of link 2.

There may be no radio switch time requirement for EMLSR UL TX; however, some implementations may try to minimize the radio switch delay to minimize channel blind period.

Figure 12:
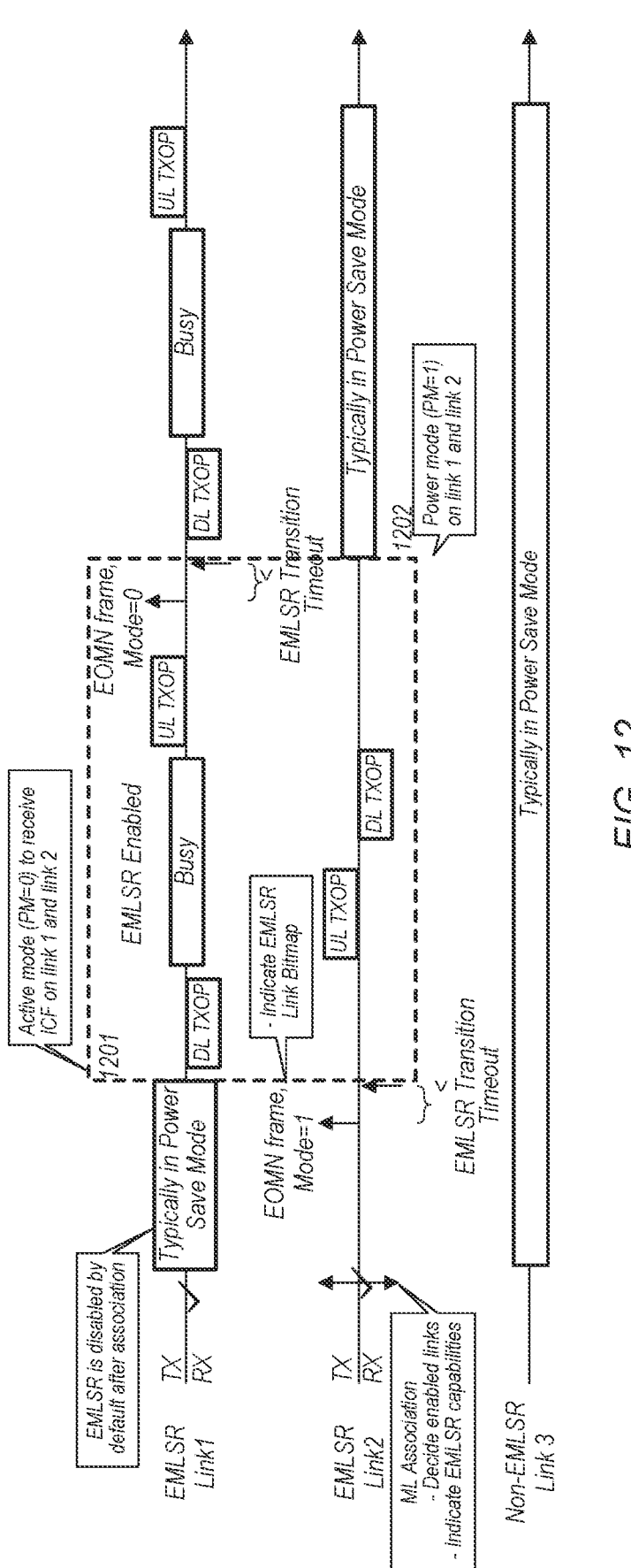

FIG. 12 illustrates EMLSR enablement and disablement, according to some embodiments. As shown, a non-AP MLD may associate with an AP MLD using 3 links. Links 1 and 2 may be indicated as EMLSR enabled (e.g., and relevant capabilities may be provided) during ML association. EMLSR operation may be disabled (e.g., by default) after the association. The non-AP MLD may request to enable EMLSR by indication (e.g., transmission of the EML Operation Mode Notification frame with mode=1) over link 2. After an EMLSR transition timeout, at time 1201, EMLSR may be enabled and may remain enabled until time 1202 (e.g., for all times inside the box). Immediately after the EMLSR enablement at time 1201, the non-AP MLD's STAs on both links may be in the active mode (e.g., power save mode (PM)=0) to be ready to receive ICF. The non-AP MLD may request to disable EMLSR by indication (e.g., transmission of the EML Operation Mode Notification frame with mode=0) over either link (e.g., link 1 in the example). After an EMLSR transition timeout, at time 1202, EMLSR may be disabled. At this time, the non-AP MLD's STAs on both links may be in a power save mode (PM=1).

FIG. 13A illustrates an EML capabilities subfield, which may be included in an ML element, according to some embodiments. During a ML (re)-association, EMLSR mode may be disabled (e.g., by default), and the following EMLSR Operating Parameters may be included in the "ML Element" in the ML Association frames:

"EMLSR Padding Delay" (e.g., representing the time duration shown as "Pad" in various figures herein, which may be the time for a non-AP MLD to switch the Full Radio between links, e.g., upon the reception of the ICF/MU-RTS sent by the AP MLD) and "EMLSR Transition Delay" (e.g., representing the time that for a non-AP to switch back to listening operation (to be ready to receive the next ICF) on both links after the end of a frame exchange (e.g., TXOP)) may be communicated from non-AP MLD to the AP MLD; and "EMLSR Transition Timeout" (e.g., representing the time for an AP MLD to provision the power save state of a second link when an EML Operation Mode Notification (EOMN) frame is received on a first link and other possible processing to be ready to enter or exit EMLSR mode) may be communicated from AP MLD to non-AP MLD.

In addition to EMLSR parameters, the EML capabilities subfield may include parameters related to enhanced multi-link multi-radio (EMLMR) operation.

FIG. 13A reflects aspects of 802.11be draft D1.4. FIG. 13B illustrates the EML capabilities subfield, similar to FIG. 13A, with updates according to aspects of 802.11be draft D2.2.

FIG. 14A illustrates an EML Control field of the EML operating mode notification (EOMN) frame, according to some embodiments. Post association, to enable or disable the EMLSR mode, a non-AP MLD may transmit an EOMN frame with "mode" set to 1 or 0, respectively. Within the EOMN frame, a non-AP MLD may use the "EMLSR Link Bitmap" to indicate the links for EMLSR operation.

FIG. 14A reflects aspects of 802.11be draft D1.4. FIG. 14B illustrates the EML Control field, similar to FIG. 14A, with updates according to aspects of 802.11be draft D2.2.

FIG. 15 illustrates an extremely high throughput (EHT) action field of an EHT Action frame, according to some embodiments. In an EHT Action frame, an EHT Action field value equal to 1 may indicate the EHT Action frame is an EML Operating Mode Notification frame. Values illustrated may be consistent with Table 9-623a—EHT Action field values in 802.11be_D1.4.

FIG. 16 illustrates an extremely high throughput (EHT) action field of an EHT Action frame, according to some embodiments. An EHT Action frame that is an EML Operation Mode Notification frame includes Category field, EHT Action field, Dialog Token field and the EML Control field. Values illustrated may be consistent with Table 9-623a—EHT Action field values in 802.11be_D1.4.

FIG. 17A illustrates further detail of an EML control field of an EOMN frame as in FIGS. 14A and 14B, according to some embodiments. Bit 0 (e.g., B0 (EMLSR Mode)) may indicate whether the non-AP operates in EMLSR mode (e.g., B0=1) or not (e.g., B0=0).

An EHT Action frame may be a term describing a group of frame types, with an EOMN frame being one of the EHT Action frames. Different EHT Action frames may have different values, e.g., as shown in FIG. 15. An EOMN may contain Category field, EHT Action field, Dialog Token field, and EML Control field, e.g., as shown in FIG. 16, according to some embodiments. The format of the EML Control field may be as shown in FIG. 17A.

FIG. 17A reflects aspects of 802.11be draft D1.4. FIG. 17B illustrates the EML control field, similar to FIG. 17A, with updates according to aspects of 802.11be draft D2.2.

Figure 18:
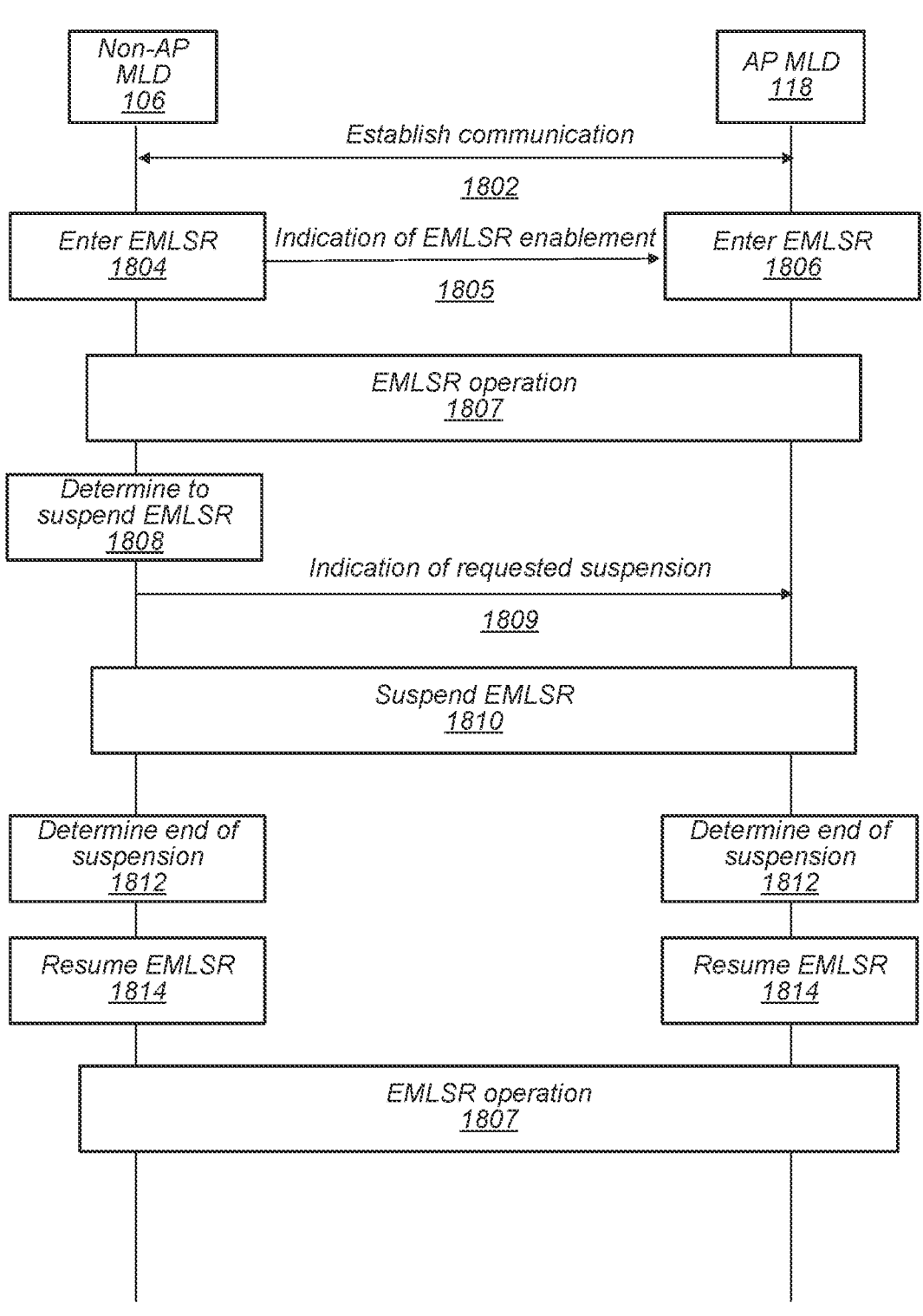
FIG. 18 illustrates an example method of EMLSR operation potentially including EMLSR suspension, according to some embodiments.

FIG. 18—Multi-Link Single Radio Operation Including Suspension and Updates According to current 802.11 standards, there may be a lack of mechanisms to allow the suspension (e.g., pause) of the EMLSR operation for a certain period while EMLSR is enabled and/or to allow the update of certain EMLSR operation parameters after association. While EMLSR is enabled, there may be situations when a pause (e.g., temporary suspension) of the EMLSR operation may be useful. For example, a non-AP MLD may not be available on either of the EMLSR links due to traffic of another RAT (e.g., co-existence interference with Bluetooth, etc.) in the same device. Some EMLSR operating parameters may change and an update after (re)-association may be useful. For example, EMLSR Bitmap, EMLSR Padding Delay, and/or EMLSR Transition Delay may be updated as discussed below.

Embodiments described herein provide systems, methods, apparatus, and devices which may be used to enable the suspension of the EMLSR operation when needed and/or to allow flexible update of EMLSR operation parameters, according to some embodiments. For example, according to embodiments of FIG. 18, AP and non-AP MLDs may exchange various messages related to EMLSR operation, suspension, and/or parameters. Embodiments of FIG. 18 may allow for suspension of EMLSR operation temporarily while the EMLSR mode is enabled. Further, relevant parameters may be added, e.g., relative to existing specifications, such as EMLSR Suspension Timeout (announced by an AP MLD, e.g., which may be needed by the AP MLD to be ready to begin the suspension (such as, but not limited to, the time needed to provision the power save state of the 2$^{nd}$ link when the EMLSR Suspension Request is transmitted by the non-AP MLD on the first link)), and EMLSR Suspension Duration (indicated for some types of suspension by a non-AP MLD). Still further, certain EMLSR operating parameters may be established during the EMLSR enablement and resume process, instead of during the association process.

Aspects of the method of FIG. 18 may be implemented by an AP MLD in communication with a non-AP MLD. The AP MLD and/or non-AP MLD may be as illustrated in and described with respect to various ones of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. For example, one or more processors (or processing elements) (e.g., processor(s) 101, 204, 302, 402, 432, 434, 439, baseband processor(s), processor(s) associated with communication circuitry such as 130, 230, 232, 329, 330, 430, etc., among various possibilities) may cause a wireless device, STA, UE, non-AP MLD, and/or AP MLD, or other device to perform such method elements.

Note that while at least some elements of the method of FIG. 18 are described in a manner relating to the use of communication techniques and/or features associated with IEEE and/or 802.11 (e.g., 802.11be) specification documents, such description is not intended to be limiting to the disclosure, and aspects of the method of FIG. 18 may be used in any suitable wireless communication system, as desired.

The methods shown may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

A non-AP MLD 106 and an AP MLD 112 may establish communication (1802), according to some embodiments. For example, the AP MLD may provide one or more links (e.g., via one or more affiliated APs) and the non-AP MLD may associate with the AP MLD via at least one of the links (e.g., using at least one affiliated STA).

The AP MLD may exchange configuration information with the non-AP MLD, e.g., related to use of the various links and/or EMLSR. The configuration information may include information such as identification of the AP MLD and/or network (e.g., SSID, etc.). Some configuration information may be related to link mapping and usage; other configuration information may be related to other subjects.

The configuration information may include parameters for EMLSR operation, such as timing parameters. For example, the AP MLD may indicate a timeout value (e.g., EMLSR Transition Timeout or EMLSR Suspension Timeout). The non-AP MLD may indicate an EMLSR padding delay, EMLSR Transition delay, and/or EMLSR Bitmap.

The configuration information may be transmitted in one or more messages including an EML capabilities subfield, among various possibilities.

The AP MLD may provide some configuration information via a beacon or other message. For example, the AP MLD may broadcast a default mapping in a beacon to all STAs in communicative range of the AP MLD or to all STAs associated with the AP MLD. The AP MLD may transmit individual configuration information, such as mappings, via individual beacons or messages.

The non-AP MLD may determine to enter EMLSR (1804), according to some embodiments. The non-AP MLD may determine to enter EMLSR anytime following association with the AP MLD. For example, the non-AP MLD may determine to enter EMLSR promptly or at a later time following association.

The non-AP MLD may transmit a message (e.g., an EOMN management frame) to the AP MLD indicating to enter EMLSR (1805), according to some embodiments. The message may include an EMLSR Bitmap indicating which links will enter EMLSR.

In some embodiments, the message may further indicate one or more parameters related to potential suspension of EMLSR. For example, the message may indicate a type of suspension that may be used (e.g., at a future time) for the EMLSR session.

In some embodiments, the message may be formatted as illustrated in or similar to one or more of the figures herein. For example, the message may include aspects of one or more of FIGS. 13-17 and/or 29-36, among various possibilities.

In some embodiments, the message used to suspend or resume the EMLSR operation may be of other frame types, such as a control frame, and/or contained in the MAC or PHY headers of a data frame.

The non-AP MLD may enter EMLSR after an EMLSR Transition Timeout (measured from the time of the message), according to some embodiments.

The AP MLD may determine to enter EMLSR mode (e.g., with respect to the non-AP MLD) (1806), according to some embodiments. The determination may be in response to receiving the message from the non-AP MLD. The AP MLD may enter EMLSR after an EMLSR transition timeout (measured from the time of the message), according to some embodiments.

In some embodiments, the AP MLD may determine to enter EMLSR mode (e.g., with respect to the non-AP MLD, noting that the AP MLD may continue communicating with other STAs as desired). The determination to enter EMLSR mode may be based on the directive provided by the non-AP at an earlier time. For example, the AP MLD may transition to EMLSR for the non-AP MLD at the preconfigured time after association as indicated by the non-AP MLD. It will be appreciated that entering EMLSR may be a non-AP MLD initiative, either by sending an EOMN frame or at a pre-configured time. The non-AP and AP MLDs may enter EMLSR at the same (e.g., pre-configured and/or based on the transition timeout) time or at different times.

The non-AP MLD 106 and AP MLD 112 may operate according to EMLSR (1807), according to some embodiments. For example, the non-AP MLD may initially use a full radio on a first link with the AP MLD and an auxiliary radio on a second link. The full radio may be capable of more spatial streams, wider BW, more duplexing, and/or otherwise higher performance than the auxiliary radio. The non-AP MLD may switch the full radio between the links any number of times from the AP MLD. For a frame exchange sequence initiated by the AP MLD, a full radio may be switched to the link on which the ICF is sent by the AP MLD if the full radio is not already on this link. For a frame exchange sequence initiated by the non-AP MLD, a full radio may be switched to the link that the non-AP MLD selects (e.g., for transition) if the full radio is not already on this link. UL and/or DL communication may be performed.

The non-AP MLD may determine to suspend EMLSR (1808), according to some embodiments. The non-AP MLD may determine to suspend EMLSR in response to ongoing and/or expected activity at the non-AP MLD. For example, the non-AP MLD may determine to suspend EMLSR based on communication activity of another RAT or RATs, such as Bluetooth. As one possibility, if ongoing or scheduled communication activity of another RAT may interfere with the (e.g., Wi-Fi) communication conducted over the EMLSR links, the non-AP MLD may determine to suspend the EMLSR mode (e.g., and suspend some or all communication on the EMLSR links). In other words, suspending EMLSR may allow the non-AP MLD to perform communication on another RAT while EMLSR communication is paused, therefore avoiding/reducing coexistence interference between the RATs. The non-AP MLD may remain in the power save mode during the entire time when the EMLSR mode is suspended.

The non-AP MLD may determine one or more parameters related to the suspension. For example, the non-AP MLD may determine an expected duration of the suspension, e.g., based on any available information about communication activity of another RAT(s). Similarly, the non-AP MLD may determine a preferred type of the suspension (e.g., fixed or variable duration). In some embodiments, the non-AP MLD may determine a preferred start time and/or end time for the suspension.

The non-AP MLD may transmit a message and/or indication of the requested suspension to the AP MLD (1809), according to some embodiments. For example, while EMLSR is enabled, a non-AP MLD may transmit an EMLSR Suspension Request frame to the AP MLD to request suspension (e.g., pause) of the EMLSR operation. The message may be transmitted on one or more of the EMLSR links. In some embodiments, the message may be transmitted on a different link (e.g., other than or in addition to the EMLSR links). Prior to transmitting the message, the non-AP MLD may determine that the channel for transmission is clear (e.g., CCA, EDCA, etc.) and/or otherwise complies with channel access rules.

The message may include an indication of any parameters related to EMLSR or the suspension. For example, the indication may include indication of the timing (e.g., start, stop, and/or duration) and/or type (e.g., fixed duration (type 1) or variable duration (type 2)) of the suspension. For example, according to a type 1 suspension, a fixed time duration in which EMLSR is suspended may be included in the EMLSR Suspension Request frame. For a type 2 suspension, the non-AP MLD may transmit an EMLSR Resume Request frame to end suspension and resume the EMLSR operation In some embodiments, a message including the indication(s) may be formatted as illustrated in or similar to one or more of the figures herein. For example, the message may include aspects of one or more of FIGS. 13-17 and/or FIGS. 29-36, among various possibilities.

In some embodiments, the message including the indication(s) may be of other frame types, such as a control frame, and/or contained in the MAC or PHY headers of a data frame.

The non-AP MLD 106 and AP MLD 112 may suspend EMLSR (1810), according to some embodiments. In some embodiments, the EMLSR operation may be suspended (e.g., paused) at the earliest time of the following.

Figures 20, 21:
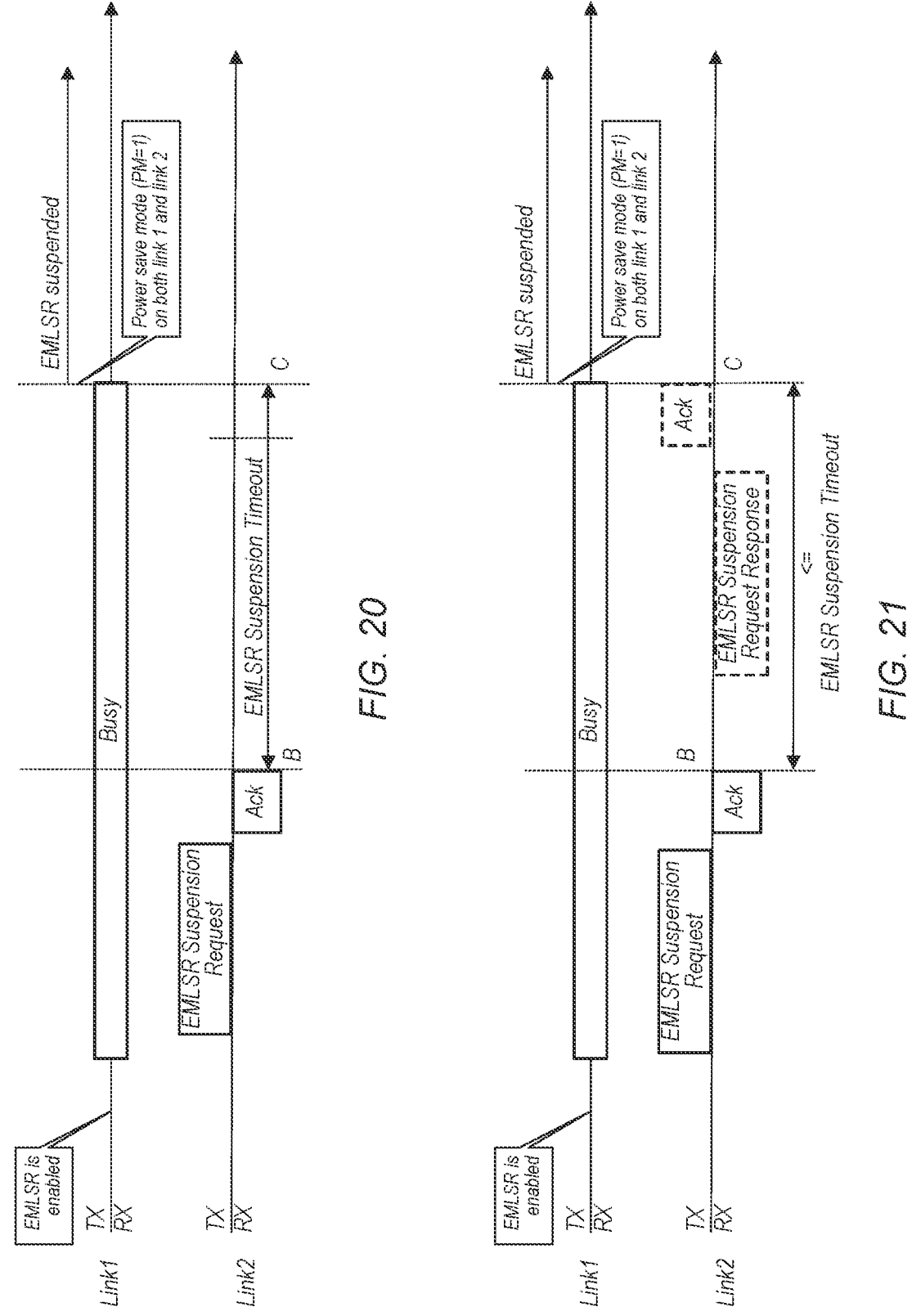

EMLSR operation may be suspended after a time period that is equal to "EMLSR Suspension Timeout" has passed after the successful transmission of the EMLSR Suspension Request frame. FIG. 20 illustrates this timing, according to some embodiments.

It will be appreciated that the successful transmission (e.g., of the of the EMLSR Suspension Request frame) may include receiving an acknowledgement (ACK) for the transmission. Thus, a time period measured from successful transmission may be considered to begin when such an ACK is received, according to some embodiments.

EMLSR operation may be suspended after the non-AP MLD has received from the AP MLD a response to the EMLSR Suspension Request (e.g., an EMLSR Suspension Request response frame). FIG. 21 illustrates this timing, according to some embodiments. Note that, as shown, this may occur prior to the completion of the "EMLSR Suspension Timeout" as illustrated in FIG. 20 (e.g., in FIG. 21, the duration of time between B and C may be less than the EMLSR suspension timeout). Further, note that the AP MLD may determine not to transmit such a response and may instead allow EMLSR to continue until the suspension timeout is completed.

Figures 22, 23:
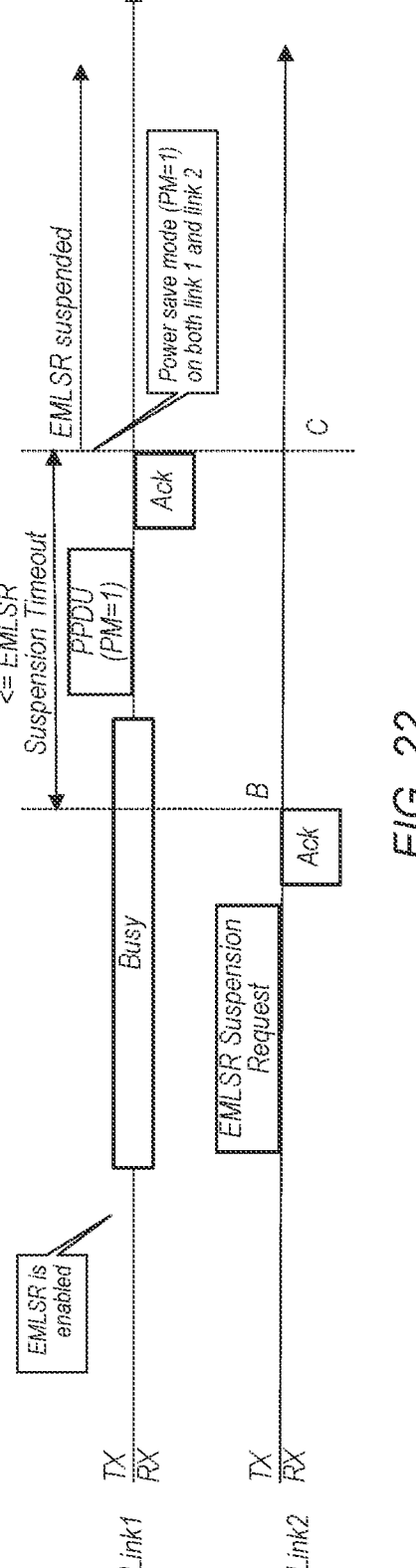

EMLSR operation may be suspended based on a transmission indicating that a power save mode is activated or entered for a different EMLSR link. FIG. 22 illustrates this timing, according to some embodiments. For example, after the transmission of EMLSR Suspension Request frame on one EMLSR link (e.g., link 2), the non-AP MLD may switch its full radio to another EMLSR link (e.g., link 1), win channel access on the other link (e.g., link 1), and successfully transmits a frame with the Power Management (PM) (e.g., power save mode) bit set to 1 (e.g., PM=1) on the other link (e.g., link 1). For example, the PM bit may be located in the Frame Control field of the MAC header of the frame. The AP MLD may acknowledge the frame, and the suspension may begin (e.g., prior to the completion of the suspension timeout). For example, in FIG. 22, the duration of time between B and C may be less than the EMLSR suspension timeout. Further, note that if the acknowledgement transmitted by the AP MLD is not received by the non-AP MLD successfully, then the EMLSR operation may continue until the suspension timeout is completed. Note: This method of non-AP MLD may also be used to shorten the time for a non-AP STA to exit the EMLSR mode after the successful transmission of an EOMN frame (with Mode set to 0) to request to disable EMLSR.

FIG. 23 illustrates power save behavior associated with beginning of EMLSR suspension (e.g., the time that a link may enter power save mode), according to some embodiments. Times B and C refer to FIGS. 20-22. As shown, STAs affiliated with the non-AP MLD link may enter the power save mode at different times depending on whether the Power Management (PM) bit in the frame control field of the MAC header of the EMLSR Suspension Request frame is set to 1 or 0. When the PM bit in the EMLSR Suspension Request frame sent on one link (e.g., link 2) is set to 1, the STA affiliated with the non-AP MLD on the same link (e.g., link 2) may enter the power save mode at time B, and the STA affiliated with the non-AP MLD on another link (e.g., link 1) may enter the power save mode at time C (e.g., when suspension begins.) When the PM bit in the EMLSR Suspension Request frame sent on one link (e.g., link 2) is set to 0, the STA affiliated with the non-AP MLD on the same link (e.g., link 2) may enter the power save mode at time C (e.g., when suspension begins.), and the STA affiliated with the non-AP MLD on another link (e.g., link 1) may also enter the power save mode at time C (e.g., when suspension begins.) Upon EMLSR suspension at time C, both STAs affiliated with the non-AP MLD on both EMLSR links are in the power save mode.

Upon suspending EMLSR, both STAs affiliated with the non-AP MLD on both EMLSR links may remain to be in power save mode during the entire duration of suspension, and the AP MLD may suspend/discontinue use of the EMLSR links for downlink communication with the non-AP MLD. However, the AP MLD may continue to monitor the suspended EMLSR links for communications from the non-AP MLD.

During the suspension of EMLSR, the non-AP MLD and the AP MLD may communicate using any other links (e.g., any active links that are not part of the suspended EMLSR links). For example, if links 1 and 2 are in EMLSR and suspended, the non-AP MLD and the AP MLD may communicate using a $3^{rd}$ link (if any).

The non-AP MLD 106 and AP MLD 112 may determine the end time of the suspension of EMLSR (1812), according to some embodiments. The manner in which this determination may occur may depend on the type of the suspension.

Figure 24:
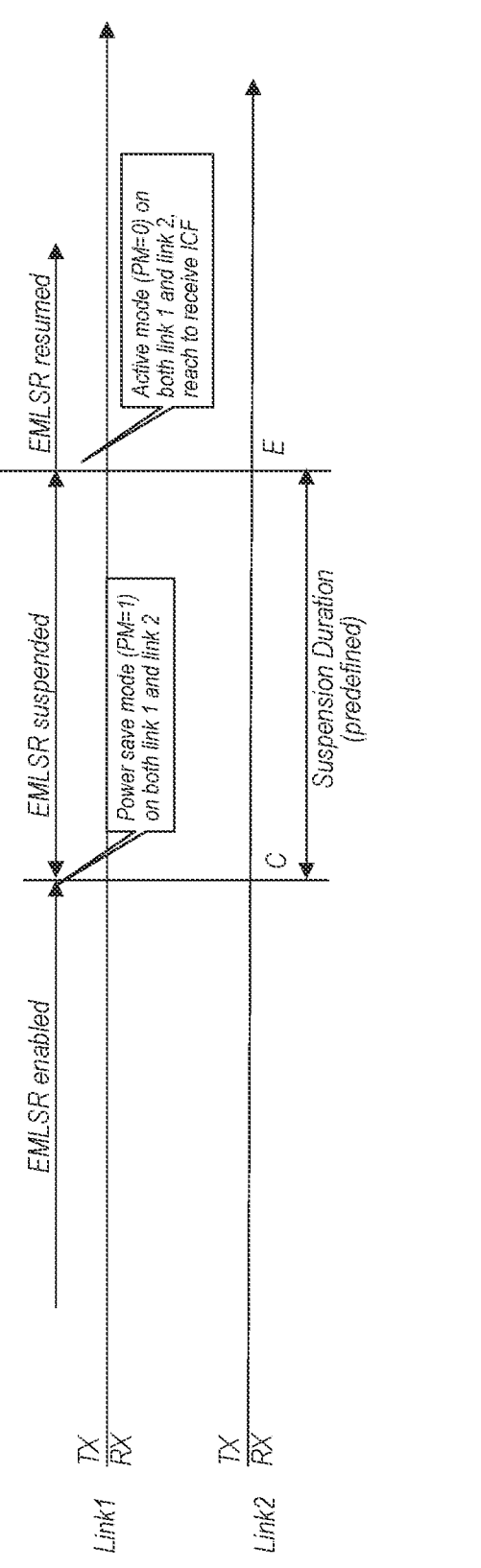

FIG. 24 illustrates a fixed duration (type 1) suspension, according to some embodiments. For example, in the case of a fixed duration (type 1) suspension, the non-AP MLD and the AP MLD may determine the end time based on an indication transmitted prior to the suspension (e.g., in association with the suspension request, a default and/or specified duration, and/or as otherwise previously agreed). In other words, after a pre-specified suspension duration, EMLSR operation may be resumed.

As another possibility, in the case of a variable duration (type 2) suspension, the non-AP MLD may transmit a message to the AP MLD indicating to end the suspension (e.g., an EMLSR resume request). The message may be transmitted on one (e.g., or possibly more) of the EMLSR links. In some embodiments, the message may be transmitted on a different link (e.g., other than or in addition to the one or more EMLSR links). Prior to transmitting the message, the non-AP MLD may determine that the channel for transmission is clear (e.g., CCA, EDCA, etc.) and/or otherwise complies with channel access rules.

In some embodiments, the message indicating the end of suspension may be formatted as illustrated in or similar to one or more of the figures herein. For example, the message may include aspects of one or more of FIGS. 13-17 and/or 29-36, among various possibilities.

In the case of the variable duration (type 2) suspension, the EMLSR operation may be resumed at the earliest time of the following, according to some embodiments.

Figures 25, 26:
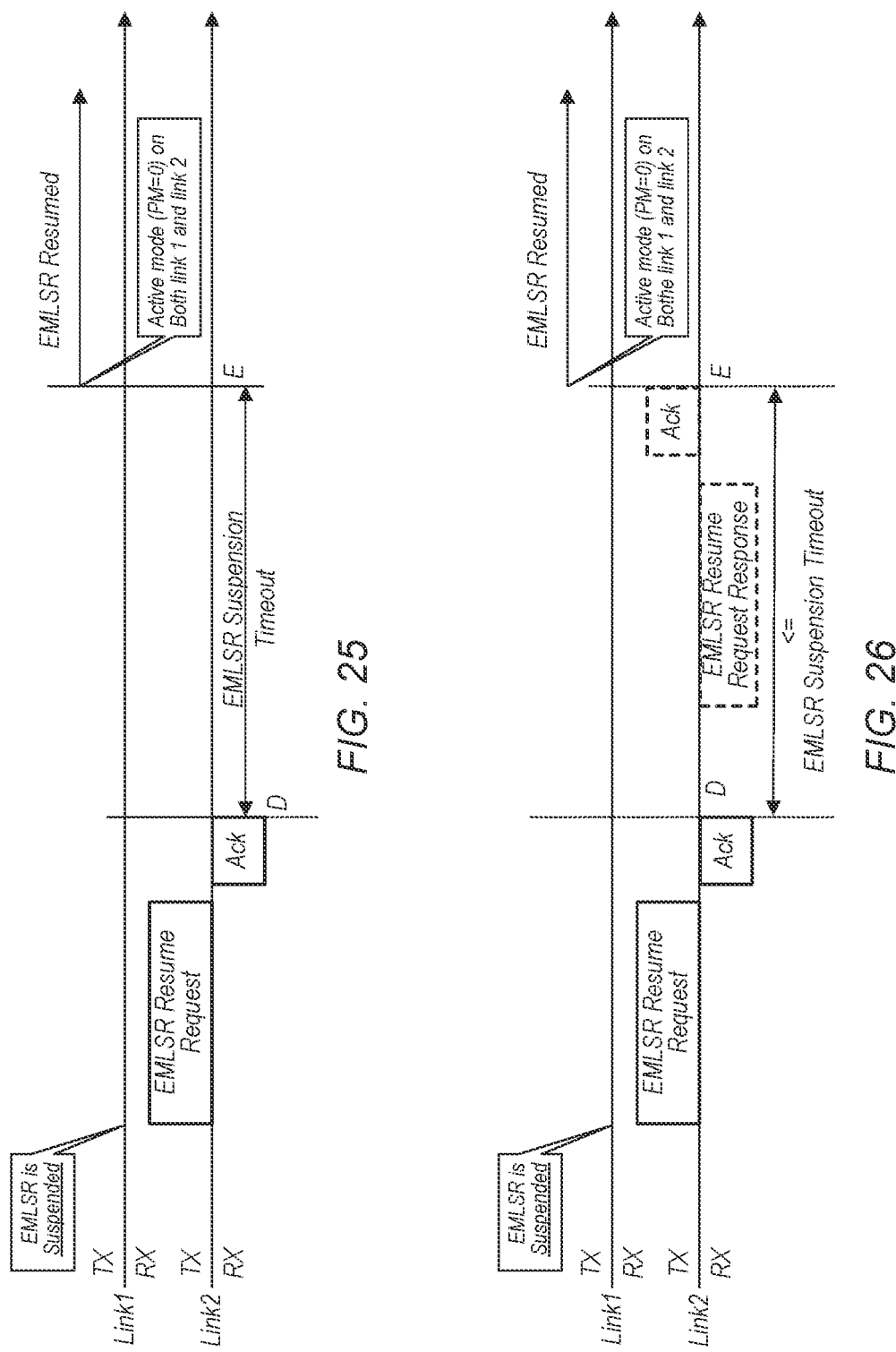

FIG. 25 illustrates a fixed duration from the message indicating the end of suspension, according to some embodiments. EMLSR operation may be resumed when, after the successful transmission of the EMLSR Resume Request frame, a time period that is equal to "EMLSR Suspension Timeout" has passed.

FIG. 26 illustrates an end of suspension based on a response from the AP MLD, according to some embodiments. EMLSR operation may be resumed when the non-AP MLD has received an EMLSR Resume Request response from the AP MLD. In other words, the AP MLD may receive the request and transmit a response. Both the AP MLD and non-AP MLD may resume EMLSR when the response is successfully transmitted from the AP MLD to the non-AP MLD. In some embodiments, successful transmission may be determined when the AP MLD successfully receives an acknowledgement (ACK) transmitted by the non-AP MLD. Note that for 802.11 devices, a frame may be considered successfully transmitted if the transmitter receives an ACK from its peer. This time may be less than the timeout, e.g., in FIG. 26, the duration of time between D and E may be less than the EMLSR suspension timeout. It will be appreciated that the AP MLD may not be required to transmit the response. In other words, the AP MLD may determine to allow the suspension timeout to continue and resume EMLSR after the EMLSR suspension timeout.

Figures 27, 28:
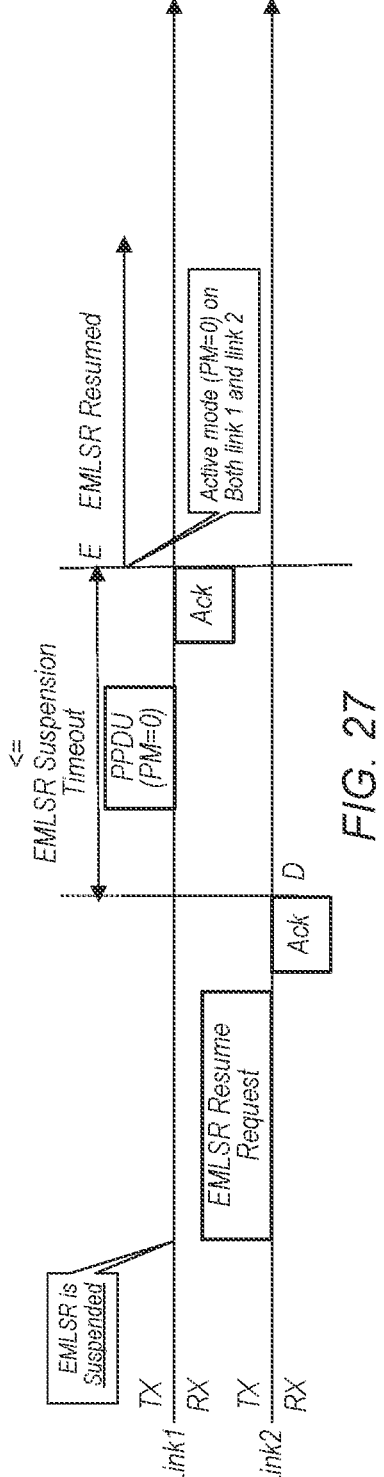

FIG. 27 illustrates an end of suspension signaled on a different link, according to some embodiments. EMLSR operation may be resumed when, after the transmission of EMLSR Resume Request frame on one link (e.g., an EMSLR link, such as link 2 in FIG. 27), the non-AP MLD switches its full radio to another EMLSR link (e.g., link 1), wins channel access on another link (e.g., link 1), and successfully transmits on the other link (e.g., link 1) a frame with the Power Management (PM) (e.g., Power Save Mode) bit set to 1 (e.g., PM=1). The AP MLD may acknowledge the frame, and the suspension may end (e.g., prior to the completion of the suspension timeout). In FIG. 27, the duration of time between D and E may be less than the EMLSR suspension timeout. Further, note that if the acknowledgement transmitted by the AP MLD is not received by the non-AP MLD successfully, then the EMLSR suspension may continue until the suspension timeout is completed. In other words, the non-AP MLD may end the suspension by using a different EMLSR link to transmit a frame (e.g., with data and/or control information) including an indication that a power save mode is exited or disabled for that link, e.g., indicating that the link is in the active mode (e.g., for use with the non-AP MLD). Note: This method of non-AP MLD may also be used to shorten the time for a non-AP MLD to enter EMLSR mode after the successful transmission of an EOMN frame (with Mode set to 1) to request to enable EMLSR.

FIG. 28 illustrates power save behavior associated with end of EMLSR suspension (e.g., the time that a link may enter active mode), according to some embodiments. Times D and E refer to FIGS. 25-27. As shown, the STAs affiliated with the non-AP MLD links may exit the power save mode at different times depending on whether the Power Management (PM) bit in the frame control field of the MAC header of the EMLSR Resume Request frame is set to 1 or 0. When the PM bit in the EMLSR Request frame sent on one link (e.g., link 2) is set to 1, the STA affiliated with the non-AP MLD on the same link (e.g., link 2) may exit the power save mode at time E (e.g., when suspension ends, and the STA affiliated with the non-AP MLD on another link (e.g., link 1) also exits the power save mode at time E (e.g., when suspension ends.) When the PM bit in the EMLSR Resume Request frame sent on one link (e.g., link 2) is set to 0, the STA affiliated with the non-AP MLD on the same link (e.g., link 2) may exit the power save mode at time D, and the STA affiliated with the non-AP MLD on another link (e.g., link 1) may exit the power save mode at time E (e.g., when suspension ends.) Upon EMLSR operation resuming at time E, both STAs affiliated with the non-AP MLD on both EMLSR links may be in the active mode.

The non-AP MLD 106 and AP MLD 112 may resume EMLSR (1814) and return to EMLSR operation (1807), according to some embodiments. EMLSR parameters may be the same (e.g., relative to pre-suspension parameter values).

In some embodiments, one or more parameters of EMLSR operation may be changed (e.g., relative to the corresponding parameter value(s) prior to the suspension). For example, either a message requesting the suspension or to resume ELMSR may indicate such a changed parameter value. Such updates to parameter values may be initiated by the non-AP MLD or the AP MLD.

According to some embodiments, aspects of the methods of FIG. 18 may enable suspension of EMLSR operation and/or allow flexible update of EMLSR operation parameters.

FIGS. 19-36 and Additional Information

Note that an EOMN frame (e.g., such as may be transmitted to enable EMLSR) can also be used to communicate and/or update parameters chosen by the non-AP STA, such as EMLSR Padding Delay, EMLSR Transition Delay, EMLSR Bitmap. A single EOMN frame may be used to perform any or all of these purposes. Alternatively, different EOMN frames may be used. Further, instead of using an EOMN management frames, the communication and/or update may use one or more other frame types, such as a control frame, and/or contained in the MAC or PHY headers of a data frame.

Figure 19:
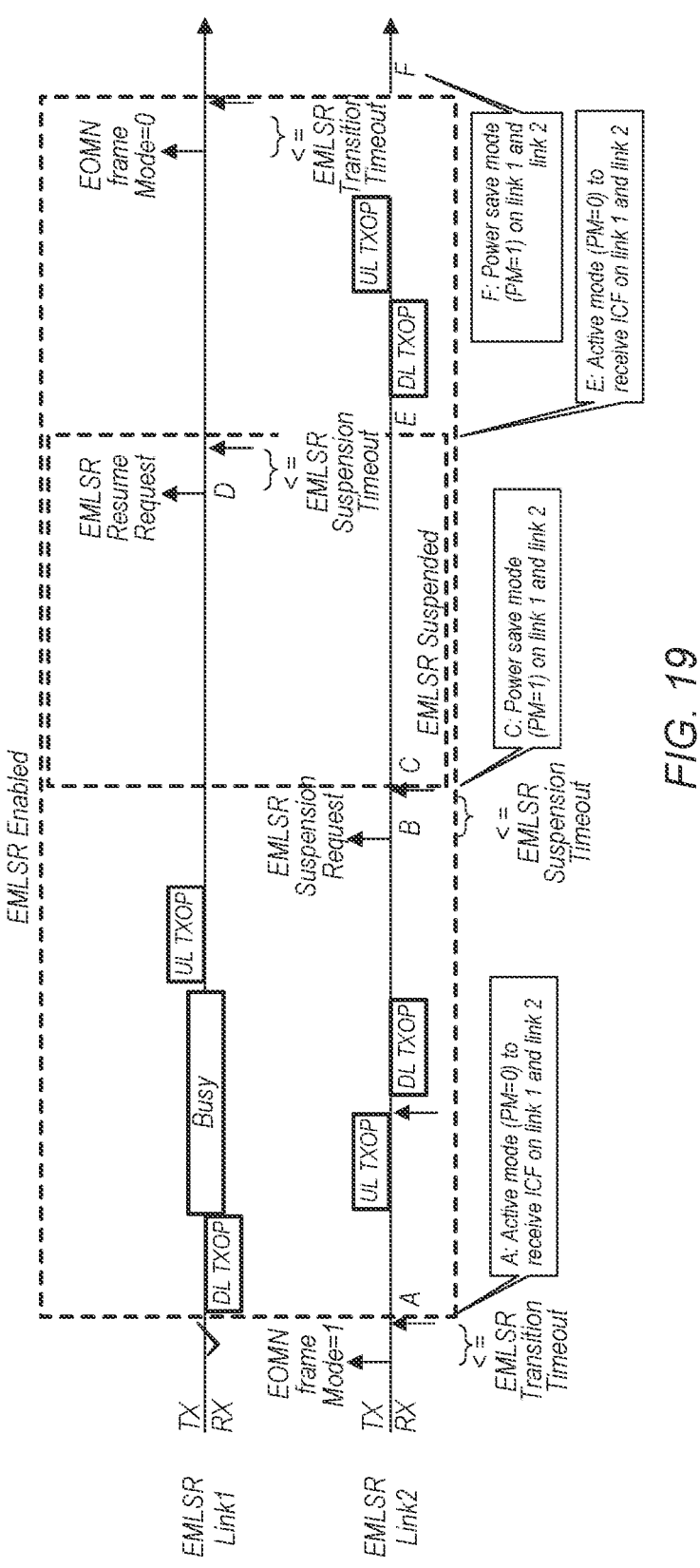

FIG. 19 illustrates a timeline of EMLSR suspension, according to some embodiments. As shown, EMLSR may be enabled at time A (e.g., following an EOMN frame with Mode set to 1), and may remain enabled to time F (e.g., based on a second EOMN frame with Mode set to 0). The time between the EOMN (with Mode set to 1) and the beginning of EMLSR enablement may be less than or equal to the EMLSR Transition Timeout period. The time between the EOMN (with Mode set to 0) and the end of EMLSR enablement may be less than or equal to the EMLSR Transition Timeout period. EMLSR may be suspended from time C to time E. Time C may occur less than or equal to a EMLSR Suspension Timeout after a suspension request at time B. In the case of a type 2 suspension, Time E may occur less than or equal to an EMLSR Suspension Timeout after the successful transmission of an EMLSR Resume Request frame at time D. In the case of a type 1 suspension, Time E may occur a fixed duration after time C.

In some embodiments, various frame types may be used to contain an EMLSR Suspension Request and/or an EMLSR Resume Request, or similar messages as discussed herein. Various length of the relevant fields may be configured as desired. The field lengths shown in figures and description are examples only. However, for illustration, various examples of the frames that can be used to transmit EMLSR Suspension Request and/or EMLSR Resume Request are discussed and illustrated. Additional parameters necessary for EMLSR operation may also be included in these frames.

As one possibility, a frame may be a revised version of the EOMN frame in 11be_D1.4 (see FIGS. 29-33). For example, as shown on FIG. 29 for one example and on FIGS. 31A and 31B for another example, the "EMLSR mode" field may be expanded from 1 bit to 2 bits, as shown in FIG. 30, to include the following new modes: "EMLSR Suspension Request" mode and "EMLSR Resume Request" mode.

As another possibility, a new management frame that is an EHT Action Management frame may be defined, where an example design is shown in FIG. 34 (e.g., EHT Action field with a newly defined value of "2" or another currently reserved value) and FIG. 35 (e.g., a newly defined EMLSR Suspension Control field). In the approach illustrated in these figures, a new management frame may be added which may be used (e.g., solely) for EMLSR suspension request and EMLSR Resume Request, while the existing EOMN frame may be used for EMLSR Enablement or EMLSR Disablement, according to some embodiments. Additional parameters necessary for EMLSR operation may also be included in these frames.

FIGS. 29A, 29B, 31A, and 31B illustrate possible structures of an EML control field, e.g., as may be included in a revised EOMN frame, according to some embodiments. The Figures show revisions relative to 9-144i of 802.11be (Draft 1.4). FIG. 30 illustrates meanings of an expanded (e.g., 2 bit) EMLSR mode field.

In addition to including parameters for EMLSR Suspension and EMLSR Resume, FIGS. 29A, 29B, 31A, and 31B may also be example designs for using a revised EOMN frame to communicate and/or update EMLSR operation parameters during the time of EMLSR Enablement and/or EMLSR Suspension, or EMLSR Resume. Examples of such EMLSR operation parameters are EMLSR Bitmap, EMLSR Padding Delay, and EMLSR Transition Delay. When EMLSR Mode=1 or 3, EMLSR Padding Delay and EMLSR Transition Delay may indicate the EMLSR operation parameters for the current enabled/resumed EMLSR session. When EMLSR Mode=0 or 2, EMLSR Padding Delay and EMLSR Transition Delay may be reserved, according to some embodiments. In some embodiments, the value 1 and 3 of EMLSR Mode may be merged into a single value (e.g., 1, e.g., to enable or resume EMLSR), and leave value "3" as reserved. Additional bits in the EML control fields of FIGS. 29A, 29B, 31A, and 31B may be reserved (e.g., up to and including B31), according to some embodiments.

FIGS. 29A and 31A reflect aspects of 802.11be draft D1.4, in addition to other material. FIGS. 29B and 31B illustrate the EML control field, similar to FIGS. 29A and 31A, with updates according to aspects of 802.11be draft D2.2.

FIG. 32A illustrates another possible structure of an EML control field, e.g., as may be included in a revised EOMN frame, according to some embodiments. The Figures show revisions relative to 9-144i of 802.11be (Draft 1.4). In the illustrated example, the EMLSR mode field may be 1 bit and the meanings for values 0 and 1 from FIG. 30 may be used. However, in other embodiments, the EMLSR mode field may be 2 bit and the meanings for values 0-3 as discussed above with respect to FIG. 30 may be used. Further, a new EMLSR Suspension Mode field (whose meanings are described in FIG. 33) may be included in the example EML Control field illustrated in FIG. 32A.

FIG. 32A reflects aspects of 802.11be draft D1.4, in addition to other material. FIG. 32B illustrates the EML control field, similar to FIG. 32A, with updates according to aspects of 802.11be draft D2.2.

FIG. 33 illustrates possible meanings of the EMLSR suspension mode field of FIGS. 32A and 32B, according to some embodiments. When EMLSR Suspension Mode=0 (e.g., suspension request), various fields may indicate information about the suspension. For example, the EMLSR suspension type field (B17) may indicate a type of the suspension (e.g., fixed duration (type 1) or variable duration (type 2)). Similarly, B21-23 may carry information about the EMLSR suspension duration (e.g., for a type 1 suspension). Additional parameters necessary for EMLSR operation may also be included.

FIGS. 34 and 35 illustrate an example of a newly defined EHT Action frame where a new value 2 (e.g., a currently reserved value) for the EHT Action field in an EHT Action frame may be added. Please note that instead of using the currently reserved value 2, another currently reserved value may be used. Such a new EHT Action frame may be (e.g., solely) used for EMLSR Suspension and EMLSR Resume. FIG. 34 illustrates a possible revision to Table 9-623a (relative to in 802.11be, Draft 1.4), describing additional EHT Action field value used by the EMLSR Suspension and EMLSR Resume, according to some embodiments. In an EHT Action frame, an EHT Action field, in the octet immediately after the Category field, may differentiate different EHT Action frames. As shown, a new meaning may be associated with a value (e.g., 2 or another currently reserved value) to indicate that an EHT action frame associated with EMLSR suspension may be used. FIG. 35 illustrates a new EHT Suspension Control field that is included in the newly designed EHT Action frame used for enter or exit EMLSLR Suspension. In other words, a new EHT Action frame may be signaled by adding a new value (e.g., 2 or another currently reserved value) for the EHT Action field in an EHT action frame which may be solely used for control of EMLSR Suspension. The new EMLSR Suspension Control field illustrated in FIG. 35 includes EMLSR Suspension related parameters, such as EMLSR Suspension Mode, Suspension Type, EMLSR Suspension Duration (if type 1 suspension is used), Suspension Type, EMLSR Suspension Duration fields may be reserved for an EMLSR Resume Request. Thus, the EMLSR suspension EHT Action frame may be used to request suspension of the EMLSR operation and/or (e.g., at a separate time) to resume the EMLSR operation after suspension. It will be appreciated that various designs may be used. However, in the example shown, EMLSR Suspension Mode B0 values may have meanings as follows: 1 may indicate an EMLSR Suspension Request, 0 may indicate EMLSR Resume Request. Although not shown in the example illustrated in FIG. 35, this new EMLSR Suspension Control field may also include parameters such as EMLSR Bitmap, EMLSR Padding Delay and EMLSR Transition Delay. Thus, these parameters may be communicated and/or updated when EMLSR operation is resumed after suspension. Other EMLSR parameters may also be included in the new EMLSR Suspension Control field.

FIG. 36A illustrates a possible message design for indicating EMLSR suspension timeout, according to some embodiments. An indication of a duration of "EMLSR Suspension Timeout" may be included in the "EML Capabilities field" in the ML element to be communicated during the (re)-association process (see FIGS. 13A and 13B, for a comparison). For example, the EML capabilities subfield, as shown in FIG. 36A may be transmitted by the AP MLD to the non-AP MLD during the association or re-association process, and may indicate the durations of the timeouts for transition and suspension to the non-AP MLD. "EMLSR Padding Delay" and "EMLSR Transition Delay" may be transmitted in a frame to enable or resume the EMLSR operation, as illustrated in FIGS. 29A, 29B, 31A, 31B, 32A, and 32B, for three design examples, among various possibilities. Inclusion of "EMLSR Padding Delay" and "EMLSR Transition Delay" in a frame transmitted to enable or resume EMLSR operation, instead of their inclusion in a frame transmitted during the association and/or re-association process, may enables a non-AP to communicate and/or update these parameters after association and/or re-association.

FIG. 36A reflects aspects of 802.11be draft D1.4, in addition to other material. FIG. 36B illustrates possible message design for indicating EMLSR suspension timeout, similar to FIG. 36A, with updates according to aspects of 802.11be draft D2.2.

In some scenarios, different EMLSR links may be assigned with different roles, such as primary link and secondary link(s). The main/full radio may stay at the primary link by default and may switch to the secondary link only when the primary link becomes unavailable and there is an opportunity for traffic exchange on one of the secondary links. The main/full radio may switch back to the primary link when the frame exchange completes on the secondary link. In the examples of FIGS. 29-33, all EMLSR links may have a common EMLSR Padding Delay value and a common EMLSR Transition Delay value. However, different links may have different (e.g., link-specific) EMLSR Padding delay and EMLSR Transition Delay, e.g., in the scenario where EMLSR links are assigned with Primary link role and secondary link role, among various possibilities. For example, a link-specific EMLSR Padding value and/or link-specific EMLSR Transition Delay value may be included in an EMLSR Operating Mode Notification frame (or other container), each with indication of the corresponding link identifier.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In one set of embodiments, a method may comprise, at a non-access point (AP) multi-link device (MLD) (non-AP MLD): associate with an AP MLD; exchange one or more multi-link parameters associated with a first mode for communication with the AP MLD; enable the first mode for a first link and a second link; transmit, to the AP MLD, a request to suspend the first mode without disabling the first mode; receive, from the AP MLD, an acknowledgement of the request to suspend the first mode without disabling the first mode; suspend the first mode; and resume the first mode.

In some embodiments, to suspend the first mode, the method may further comprise enter a power save mode for the first link and for the second link, wherein both the first link and the second link are in the power save mode for at least a portion of time while the first mode is suspended.

In some embodiments, exchanging the one or more multi-link parameter with the AP MLD includes receiving an indication of a duration of a first mode suspension timeout, wherein said suspension of the first mode occurs after a period of time equal to the duration of the first mode suspension timeout from the acknowledgement of the request to suspend the first mode without disabling the first mode.

In some embodiments, said suspension of the first mode occurs in response to receiving a response from the AP MLD to the request to suspend the first mode without disabling the first mode.

In some embodiments, the request to suspend the first mode without disabling the first mode is transmitted on the first link at a first time, wherein said suspension of the first mode occurs in response to successful transmission, to the AP MLD on the second link at a second time subsequent to the first time, a frame including an indication that a power save mode is enabled for the second link.

In some embodiments, the method may further comprise transmit, to the AP MLD, a request to resume the first mode.

In some embodiments, the transmission of the request to resume the first mode is a successful transmission, wherein exchanging the one or more multi-link parameter with the AP MLD includes receiving an indication of a duration of a first mode suspension timeout, wherein said resuming of the first mode occurs after a period of time equal to the duration of the first suspension timeout from the successful transmission of the request to resume the first mode.

In some embodiments, said resuming of the first mode occurs in response to receiving a response from the AP MLD to the request to resume the first mode.

In some embodiments, the request to resume the first mode is transmitted on the first link at a first time, wherein said resuming of the first mode occurs in response to transmitting, to the AP MLD on the second link at a second time subsequent to the first time, a frame including an indication that a power save mode is disabled for the second link.

In some embodiments, the first mode comprises enhanced multi-link single radio (EMLSR).

In one set of embodiments, a method at a non-access point (AP) multi-link device (MLD) (non-AP MLD) may be as follows. The non-AP MLD may comprise: a first radio and a second radio having less capability than the first radio. The method may comprise: establish communication with an AP MLD; transmit, to the AP MLD, at least one parameter related to an enhanced multi-link single radio (EMLSR) mode; operate, according to the EMLSR mode, for a first period of time; suspend, for a second period of time subsequent to the first period of time, operation according to the EMLSR mode; and resume, subsequent to the second period of time, operation according to the EMLSR mode.

In some embodiments, to suspend operation according to the EMLSR mode, the method may further comprise transmit an enhanced EMLSR Operation Mode Notification frame containing a first enhanced multi-link control field comprising a first EMLSR mode field comprising more than 1 bit, wherein a value of the first EMLSR mode field indicates a request for suspension of operation according to the EMLSR mode.

In some embodiments, the first enhanced multi-link control field further comprises an indication of a requested duration of suspension of operation according to the EMLSR mode.

In some embodiments, to resume operation according to the EMLSR mode, the method may further comprise transmit a second enhanced EMLSR Operation Mode Notification frame containing a second enhanced multi-link control field comprising a second EMLSR mode field comprising more than 1 bit, wherein a value of the second EMLSR mode field indicates a request to resume EMLSR operation.

In some embodiments, the second enhanced multi-link control field further comprises an indication of padding delay for a current EMLSR session.

In some embodiments, to suspend operation according to the EMLSR mode, the method may further comprise transmit a third enhanced multi-link control field comprising an EMLSR suspension mode field.

In some embodiments, to suspend operation according to the EMLSR mode, the method may further comprise transmit an extremely high throughput (EHT) action frame comprising a value indicating a request for suspension of operation according to the EMLSR mode.

In some embodiments, the at least one parameter related to EMLSR mode comprises link specific indications for a first link and for a second link.

In one set of embodiments, a method may comprise: at an access point (AP) multi-link device (MLD) (AP MLD): providing a plurality of links comprising at least a first link and a second link; associating with a non-access point MLD (non-AP MLD); exchanging, with the non-AP MLD, at least one parameter related to an enhanced multi-link single radio (EMLSR) mode; receiving, from the non-AP MLD on the first link or the second link, a request to enter the EMLSR mode for the first link and the second link; receiving, from the non-AP MLD on the first link or the second link, a request to suspend the EMLSR mode for the first link and the second link; suspending, for the non-AP MLD, the EMLSR mode for the first link and the second link; determining a time to resume the EMLSR mode, for the non-AP MLD, of the EMLSR mode for the first link and the second link; and resuming, for the non-AP MLD, the EMLSR mode for the first link and the second link.

In some embodiments, said determining the time to resume the EMLSR mode is based on receiving an EMLSR resume request and occurs at the earliest of: completion of an EMLSR suspension timeout after receiving the EMLSR resume request; transmitting an EMLSR resume request response; or receiving, on a different link than the EMLSR resume request, a frame with a power save mode bit indicating that a power save mode is disabled for the different link.

Any of the methods described herein for operating an AP MLD may be the basis of a corresponding method for operating a non-AP MLD and vice versa, e.g., by interpreting each message/signal X received by the non-AP MLD in the DL as message/signal X transmitted by the AP MLD, and each message/signal Y transmitted in the UL by the non-AP MLD as a message/signal Y received by the AP MLD. Moreover, a method described with respect to an AP MLD may be interpreted as a method for a non-AP MLD in a similar manner.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (and/or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a non-access point (AP) multi-link device (MLD) (non-AP MLD) to:
associate with an AP MLD;
exchange one or more multi-link parameters associated with a first mode for communication with the AP MLD, wherein exchanging the one or more multi-link parameters with the AP MLD includes receiving an indication of a duration of a first mode suspension timeout;
enable the first mode for a first link and a second link;
transmit, to the AP MLD, a request to suspend the first mode without disabling the first mode;
receive, from the AP MLD, an acknowledgement of the request to suspend the first mode without disabling the first mode;
suspend the first mode, wherein said suspension of the first mode occurs after a period of time equal to the duration of the first mode suspension timeout from the acknowledgement of the request to suspend the first mode without disabling the first mode; and
resume the first mode subsequent to the suspending.

2. The apparatus of claim 1, wherein, to suspend the first mode, the processor is further configured to cause the non-AP MLD to enter a power save mode for the first link and for the second link, wherein both the first link and the second link are in the power save mode for at least a portion of time while the first mode is suspended.

3. The apparatus of claim 1, wherein said suspension of the first mode occurs subsequent to receiving a response from the AP MLD to the request to suspend the first mode without disabling the first mode.

4. The apparatus of claim 1, wherein the request to suspend the first mode without disabling the first mode is transmitted on the first link at a first time, wherein said suspension of the first mode occurs in response to successful transmission of a frame, to the AP MLD on the second link at a second time subsequent to the first time, the frame comprising an indication that a power save mode is enabled for the second link.

5. The apparatus of claim 1, wherein the processor is further configured to cause the non-AP MLD to transmit, to the AP MLD, a request to resume the first mode.

6. The apparatus of claim 5, wherein exchanging the one or more multi-link parameters with the AP MLD comprises receiving an indication of a duration of a first mode suspension timeout, and wherein said resuming of the first mode occurs after a period of time equal to the duration of the first mode suspension timeout following successful transmission of the request to resume the first mode.

7. The apparatus of claim 5, wherein said resuming of the first mode occurs subsequent to receiving a response from the AP MLD to the request to resume the first mode.

8. The apparatus of claim 5, wherein the request to resume the first mode is transmitted on the first link at a first time, wherein said resuming of the first mode occurs in response to transmitting a frame, to the AP MLD on the second link at a second time subsequent to the first time, the frame comprising an indication that a power save mode is disabled for the second link.

9. The apparatus of claim 1, wherein the first mode comprises an enhanced multi-link single radio (EMLSR) mode.

10. A non-access point (AP) multi-link device (MLD) (non-AP MLD), comprising:
a first radio;
a second radio having a different capability than the first radio; and
a processor operably coupled to the first radio and the second radio, and configured to cause the non-AP MLD to:
establish communication with an AP MLD, said establishing communication comprising indicating a parameter related to an enhanced multi-link single radio (EMLSR) mode, the parameter comprising an EMLSR Bitmap, an EMLSR Padding Delay, or an EMLSR Transition Delay;
transmit, to the AP MLD, an enhanced EMLSR Operation Mode Notification (EOMN) frame, the EOMN frame comprising an update of the parameter; and
operate, according to the EMLSR mode, for a first period of time.

11. The non-AP MLD of claim 10, wherein the processor is further configured to cause the non-AP MLD to:
suspend, for a second period of time subsequent to the first period of time, operation according to the EMLSR mode; and
resume, subsequent to the second period of time, operation according to the EMLSR mode.

12. The non-AP MLD of claim 11, wherein to suspend operation according to the EMLSR mode, the processor is further configured to cause the non-AP MLD to transmit an enhanced EMLSR Operation Mode Notification frame containing a first enhanced multi-link control field comprising a first EMLSR mode field comprising more than 1 bit, wherein a value of the first EMLSR mode field indicates a request for suspension of operation according to the EMLSR mode.

13. The non-AP MLD of claim 12, wherein the first enhanced multi-link control field further comprises an indication of a requested duration of suspension of operation according to the EMLSR mode.

14. The non-AP MLD of claim 11, wherein to resume operation according to the EMLSR mode, the processor is further configured to cause the non-AP MLD to transmit a second enhanced EMLSR Operation Mode Notification frame containing a second enhanced multi-link control field comprising a second EMLSR mode field comprising more than 1 bit, wherein a value of the second EMLSR mode field indicates a request to resume EMLSR operation.

15. The non-AP MLD of claim 14, wherein the second enhanced multi-link control field further comprises a padding delay indication for a current EMLSR session.

16. The non-AP MLD of claim 15, wherein to suspend operation according to the EMLSR mode, the processor is further configured to cause the non-AP MLD to transmit a third enhanced multi-link control field comprising an EMLSR suspension mode field.

17. The non-AP MLD of claim 16, wherein to suspend operation according to the EMLSR mode, the processor is further configured to cause the non-AP MLD to transmit an extremely high throughput (EHT) action frame comprising a value indicating a request for suspension of operation according to the EMLSR mode.

18. A method, comprising:
at an access point (AP) multi-link device (MLD) (AP MLD):
  providing a plurality of links comprising at least a first link and a second link;
  associating with a non-access point MLD (non-AP MLD);
  exchanging, with the non-AP MLD, a parameter related to an enhanced multi-link single radio (EMLSR) mode, the parameter comprising an EMLSR Bitmap, an EMLSR Padding Delay, or an EMLSR Transition Delay; and
  receiving, from the non-AP MLD on the first link or the second link, an enhanced EMLSR Operation Mode Notification (EOMN) frame, the EOMN frame comprising an update of the parameter.

19. The method of claim 18, further comprising:
receiving, from the non-AP MLD on the first link or the second link, a request to enter the EMLSR mode for the first link and the second link;
receiving, from the non-AP MLD on the first link or the second link, a request to suspend the EMLSR mode for the first link and the second link;
suspending, for the non-AP MLD, the EMLSR mode for the first link and the second link;
determining a time to resume the EMLSR mode, for the non-AP MLD, of the EMLSR mode for the first link and the second link; and
resuming, for the non-AP MLD, the EMLSR mode for the first link and the second link.

20. The method of claim 19, wherein said determining the time to resume the EMLSR mode is based on receiving an EMLSR resume request and occurs at the earliest of:
completion of an EMLSR suspension timeout after receiving the EMLSR resume request;
transmitting an EMLSR resume request response; or
receiving, on a different link than the EMLSR resume request, a frame with a power save mode bit indicating that a power save mode is disabled for the different link.

\* \* \* \* \*